US011498855B2

(12) United States Patent
Cosentino et al.

(10) Patent No.: US 11,498,855 B2
(45) Date of Patent: Nov. 15, 2022

(54) ELECTROLYTIC BIOCIDE-GENERATING UNIT

(71) Applicant: ElectroSea, LLC, Wayzata, MN (US)

(72) Inventors: Louis Ciro Cosentino, Palm Beach Gardens, FL (US); Daniel L. Cosentino, Wayzata, MN (US); Brian Alan Golden, Eden Prairie, MN (US)

(73) Assignee: ElectroSea, LLC, Wayzata, MN (US)

( * ) Notice: Subject to any disclaimer, the term of this patent is extended or adjusted under 35 U.S.C. 154(b) by 225 days.

(21) Appl. No.: 16/843,328

(22) Filed: Apr. 8, 2020

(65) Prior Publication Data

US 2020/0325041 A1    Oct. 15, 2020

Related U.S. Application Data

(60) Provisional application No. 62/858,739, filed on Jun. 7, 2019, provisional application No. 62/831,526, filed on Apr. 9, 2019.

(51) Int. Cl.
*C02F 1/461* (2006.01)
*C02F 1/46* (2006.01)
*C02F 1/467* (2006.01)

(52) U.S. Cl.
CPC ........ *C02F 1/46104* (2013.01); *C02F 1/4606* (2013.01); *C02F 1/4674* (2013.01); *C02F 2001/46152* (2013.01); *C02F 2201/4614* (2013.01); *C02F 2201/4616* (2013.01); *C02F 2201/46145* (2013.01); *C02F 2201/46155* (2013.01); *C02F 2209/02* (2013.01); *C02F 2303/20* (2013.01)

(58) Field of Classification Search
CPC ................ C02F 1/46104; C02F 1/4674; C02F 2201/4614
See application file for complete search history.

(56) References Cited

U.S. PATENT DOCUMENTS

| | | |
|---|---|---|
| 3,010,886 A | 11/1961 | Chappell |
| 3,241,512 A | 3/1966 | Green |
| 3,458,413 A | 7/1969 | Ueda et al. |
| 4,173,525 A | 11/1979 | Nakamatsu et al. |
| 4,488,945 A | 12/1984 | Spaziante |
| 4,561,955 A | 12/1985 | Jackson |
| 5,807,473 A | 9/1998 | Sadler et al. |
| 5,853,562 A | 12/1998 | Eki et al. |

(Continued)

FOREIGN PATENT DOCUMENTS

| | | |
|---|---|---|
| DE | 10 2004 005 303 A1 | 8/2005 |
| EP | 2 394 965 A1 | 12/2011 |

(Continued)

OTHER PUBLICATIONS

Abdel-Aal et al., "Hydro gen Production Using Sea Water Electrolysis," The Open Fuel Cells Journal, vol. 3, pp. 1-7 (2010).

(Continued)

*Primary Examiner* — Nicholas A Smith
(74) *Attorney, Agent, or Firm* — Merchant & Gould P.C.

(57) ABSTRACT

The present disclosure relates to a biocide-generating device for outputting a biocide to a water system. The biocide-generating device includes a power circuit positioned within a housing that defines an electrolytic cell of the biocide-generating device.

23 Claims, 13 Drawing Sheets

(56) References Cited

U.S. PATENT DOCUMENTS

| | | | |
|---|---|---|---|
| 6,096,177 | A | 8/2000 | Kamitani et al. |
| 6,391,167 | B1 * | 5/2002 | Grannersberger .. C02F 1/46104 |
| | | | 204/228.3 |
| 6,716,325 | B2 | 4/2004 | Bentley |
| 6,821,398 | B2 | 11/2004 | Von Broembsen |
| 8,163,141 | B2 | 4/2012 | Von Broembsen |
| 8,968,575 | B2 | 3/2015 | Zolotarsky et al. |
| 2003/0024809 | A1 | 2/2003 | Broembsen |
| 2006/0169647 | A1 | 8/2006 | Doyle et al. |
| 2007/0095732 | A1 | 5/2007 | Lutz |
| 2008/0000775 | A1 | 1/2008 | Childers, II et al. |
| 2009/0229992 | A1 | 9/2009 | Sanchez et al. |
| 2010/0213049 | A1 | 8/2010 | Burtsch |
| 2013/0068631 | A1 * | 3/2013 | Brochu .................. C02F 1/467 |
| | | | 205/743 |
| 2013/0087450 | A1 | 4/2013 | Antozzi et al. |
| 2016/0326023 | A1 * | 11/2016 | Park ...................... C02F 1/4674 |
| 2019/0023596 | A1 | 1/2019 | Trela |
| 2019/0106339 | A1 | 4/2019 | Cosentino et al. |

FOREIGN PATENT DOCUMENTS

| | | |
|---|---|---|
| KR | 10-0663332 B1 | 1/2007 |
| WO | WO 2010/022057 A1 | 2/2010 |

OTHER PUBLICATIONS

About our Equipment, http://electrichlor.com/equipment/, Electrichlor, 4 pages (Copyright 2012).
Assessment of the Effects of Chlorinated Seawater from Power Plants on Aquatic Organisms, Interagency Energy/Environment R&D Program Report, Environmental Protection Agency, EPA-600/7-28-221, 76 pages (Nov. 1978).
AS-US Standard Brochure, Arctic Steel, 4 pages (Feb. 2016).
Carson, "CircuPool RJ Series Salt Chlorine Generator," Pool Product Magazine, http://www.poolproductreviewsmagazine.com/, 4 pages (Jun. 2009).
Cathelco Cathodic Protection Systems in Australia by Marine Plant Systems, Marine Plant Systems Pty Ltd., pp. 1-6 (Mar. 23, 2017).
Chaplin, "Electrolysis of Water," http://www1.lsbu.ac.uk/phpcgiwrap/water/pfp.php3?page=http://www1.lsbu.ac.uk/water/electrolysis.html, pp. 1-5 (Feb. 27, 2017).
Chemistry of Sea Water, Chapter VI, pp. 165-227.
Chemtrol Pool Control—Chemical Automation, http://www.sbcontrol.com/salt_generators.htm, pp. 1-3 (Date Downloaded Jan. 23, 2017).
Chen et al., $Ti/RuO_2$—$Sb_2O_5$—$SnO_2$ electrodes for chlorine evolution from seawater, Chemical Engineering Journal, Vol. 172, pp. 47-51 (2011).
Chlorine Analyser, http://www.turtletough.com.au/product/chlorine-analyser-2/#woocommerce-tabs3, pp. 1-4 (Mar. 6, 2017).
Chlorine Analyzer for Chlorine Dosing Control, http://www.processinstruments.net/products/chlorine-analyzer/?gclid=CIuGzpKq19ECFcVEhgodPkMH3w, pp. 1-2 (Jan. 23, 2017).
Chlorine Generator, http://www.doheny.com/poolsupplies/ChlorineGenerator5742.html?adpos=1o6&creative=116116201388&device=c&matchtype=&network=g&gclid=CjwKEAiA, 2 pages (Copyright 2015).
Chlorine Measurement by Amperometric Sensor, Application Data Sheet, Emerson Process Management, ADS 43-6063/rev.B, 3 pages (Feb. 2009).
CircuPool RJ Plus Series Electronic Chlorine Generator Owner's Manual, CircuPool Products, pp. 1-29.
CircuPool RJ-30 Classic Replacement Cell, http://www.discountsaltpool.com/CircuPool-RJ-30-Classic-Replacement-Salt-Cell.phpk, pp. 1-2 (Jan. 15, 2017).
Clomburg et al,. Industrial biomanufacturing: (Jan. 6, 2017) the future of chemical production, Science, vol. 355, 12 pages.
Compu-Chlor Auto Cleaning Replacement Cells, http://www.compupool.com.au/product/genuine_cells_auto.htm, 1 page (Jan. 15, 2017).

CPSC Series Auto Cleaning Replacement Cells, http://www.compupool.com.au/product/genuine_cells_cpsc.html, 1 page (Jan. 15, 2017).
Current Limiting, Apex Manufacturing, Inc., www.apexanalog.com, AN09U RevE, pp. 1-3 (Oct. 2012).
Driving Capacitive Loads, Apex Manufacturing, Inc. www.apexanalog.com, AN25U RevG, pp. 1-19 (Oct. 2012).
DX Seawater Pumps Reliable & Heavy-duty Centrifugal Pumps, Domestic Murine, ISO 9001-2008, 2 pages (Feb. 26, 2010).
Effects of Wastewater and Cooling Water Chlorination on Aquatic Life, Enviromental Protection Agency, EPA-600/3-76-098, 54 pages (Aug. 1976).
Electrolytic Cells, http://chemed.chem.purdue.edu/genchem/topicreview/bp/ch20/faraday.php, pp. 1-10 (Date Downloaded Feb. 26, 2017).
Evaluation Kit, Apex Manufacturing, Inc., www.apexanalog.com, EK27U Rev F, pp. 1-9 (Dec. 2015).
Flat Plate vs. Round, Electrichlor, http://electrichlor.com/flat-plate-vs-round/, pp. 1-4 (Copyright 2012).
General Operating Considerations, Apex Manufacturing, Inc., www.apexanalog.com, AN01U RevJ, pp. 1-13 (Oct. 2012).
GENH30-25, TDK-Lambda Americas-Inc, https://www.genesysdcstore.com/collections/120-volt-options/products/genh30-26, pp. 1-6 (Copyright 2017).
Genuine CircuPool® Replacement Parts, http://circupool.mybigcommerce.com/parts/?sort=featured&page=2, pp. 1-2 (Date Downloaded Jan. 15, 2017).
Grandison et al., "A Review of Marine Growth Protection System (MGPS) Options for the Royal Australian Navy," Maritime Platforms Division, DSTO-TR-2631, 38 pages (Dec. 2011).
Hsu et al., "Effects of electrode settings on chlorine generation efficiency of electrolyzing seawater," Journal of Food and Drug Analysis, vol. 23, pp. 729-734 (2015).
Hypochlorite Generators, Electrichlor, http://electrichlor.com/mariners/, pp. 1-4 (Copyright 2012).
Hypopac Concentric Tubular Cell, http://titanindia.com/hypopac-concentric-tubular-cell.html, pp. 1-3 (Copyright 2016).
IntelliChlor® Electronic Chlorine Generator (Model IC60, IC40, IC20) Installation and User's Guide, 48 pages (Copyright 2009).
International Search Report and Written Opinion for Application No. PCT/US2018/054200 dated Dec. 21, 2018.
Iridium Coated Titanium Anodes: Sources, Anticipated Life, Applications, http://www.finishing.com/141/64.shtml, pp. 1-9 (Copyright 1995-2016).
Kraft et al., "Electrochemical water disinfection Part I: Hypochlorite production from very dilute chloride solutions," Journal of Applied Electrochemistry, vol. 29, Issue 7, pp. 859-866 (Jul. 1999).
Liang et al., "Research on Electrochemical Behavior of Ti—Ir—Ru Anode Coating in Electrolytic Antifouling of Flowing Brine," Journal of Materials Engineering and Performance, vol. 18, No. 8, pp. 1086-1090 (Nov. 2009).
Macdonald et al., The Interaction of Chlorine and Seawater, Pacific Marine Science Report 77-6, 55 pages (Feb. 1977).
Manasfi et al., "A Comparison Between Freshwater and Seawater Swimming Pools: From Disinfection By-products Profile to Genotoxicity," $6^{th}$ International Conference on Swimming Pool and Spa Conference, 9 pages (Mar. 2015).
Marine (Offshore) Application Electrochlorination System, http://www.qdmis.com/marine-offshore-electro-chlorinator_p54.html, pp. 1-8 (Copyright 2015-2017).
McPherson, "Amperometric vs. colorimetric methods for on-line measurement of chlorine," WaterWorld, http://www.waterworld.com/articles/print/volume-28/issue-8/editorial-features/amperometric-vs-colorimetric-methods-for-on-line-measurement-of-chlorine.html, 5 pages (Mar. 6, 2017).
Memo: Formation and effect of seawater chlorination by-products in relation with the chlorination of Hammerfest LNG cooling-water, 14 pages.
Oh et al., "Evaluation of a seawater electrolysis process considering formation of free chlorine and perchlorate," Desalination and Water Treatment, vol. 18, pp. 245-250 (Jun. 2010).
On-Board Waste Treatment LECTRA/SAN MC, http://raritaneng.com/onboardwastetreatmentlectrasanmc/, pp. 1-4 (Copyright 2017).

(56) References Cited

OTHER PUBLICATIONS

Operational Amplifier Basics, Apex Manufacturing, Inc. www.apexanalog.com, AN31U RevD, pp. 1-3 (Oct. 2012).
OpimumOxides™ Data Sheet, Optimum Anode Technologies, Inc., 4 pages (Copyright 2012).
Pentair Rainbow 320 Automatic In-Line Chlorine/Bromine Feeder, http://www.poolsupplyworld.com/pentair-Rainbow-320-Automatic-In-Line-ChlorineBromine-Feeder/R171096.htm?xzm2&ecmpid=aw_pla_search_R171096&a, pp. 1-5 (Copyright 2016).
Pikaar et al., "Electrochemical sulfide oxidation from domestic wastewater using mixed metalcoated titanium electrodes," Water Research, vol. 45, Issue 17, pp. 5381-5388 (Nov. 2011).
PM224 MOSFET Power Amplifier Module PM224HV MOSFET High Voltage Power Amplifier Module, http://www.marchandelec.com/pm224.html, pp. 1-2 (Date Downloaded Feb. 12, 2017).
Polman et al., "Results and Benefits of the Adoption of Pulse-Chlorination® for Industrial Cooling Seawater Antifouling at Qatargas, Ras Laffan Industrial City, Qatar," pp. 1-9 (2012).
Power Amp Output Impedance, Apex Manufacturing, Inc., www.apexanalog.com, AN10U RevD, pp. 1-2 (Oct. 2012).
Power Amplifier Support Components, Apex Manufacturing, Inc. www.apexanalog.com, AN PA50U RevB, pp. 1-2 (Nov. 2012).
Power Operational Amplifier, Apex Manufacturing, Inc. www.apexanalog.com, PA50U RevJ, 4 pages (Jan. 2015).
Programmable Power Supplies, Apex Manufacturing, Inc., www.apexanalog.com, AN07U RevE, pp. 1-3 (Oct. 2012).
Rajaopal, S. "Chlorination and Biofouling Control in Industrial Cooling Water Systems," Chapter 8, Operational and Environmental Consequences of Large Industrial Cooling Water Systems, pp. 163-182 (2012).
Regulated Adjustable DC Power Supply HY5020EX 50V 20A Over-Voltage Reverse-Voltage Protection, http://www.volteq.com/volteq-power-supply-hy5020ex-50v-20a-over-voltage-over-current-protection.html, pp. 1-6 (Copyright 2006).
RS-150 Series 150W Single Output Switching Power Supply, 2 pages (Jul. 8, 2015).
Ru-ir coated titanium electrode assembly for salt water electrolysis, http://www.bjchangli.com.cn/product/1731406881-220830537/Ru_Ir_coated_titanium_electrode_assembly_for_salt_water_electrolysis.html, pp. 1-7 (Copyright 1999-2016).
Saleem, "Biofouling Management in the Cooling Circuit of a Power Industry Using Electrochemical Process," J. Chem. Soc. Pak, vol. 33, No. 3, pp. 295-304 (2011).
Salt water chlorination, Wikipedia, https://en.m.wikipedia.org/wiki/Salt_water_chlorination, pp. 1-7 (Date Downloaded Jan. 15, 2017).
Seawater chlorination systems, http://www.titanindia.com/seawater-chlorination-systems.html, pp. 1-3 (Date Downloaded Jan. 15, 2017).
Seawater Electrochlorination Systems, De Nora Water Technologies, pp. 1-8 (Copyright 2015).
Single Supply Operation of Power Operational Amplifiers, Apex Manufacturing, Inc. www.apexanalog.com, AN21U RevD, pp. 1-6 (Oct. 2012).
Tsolaki et al., "Technologies for ballast water treatment: a review," J. Chem. Technol. Biotechnol., vol. 85, pp. 19-32 (2010).
Turbo Cell & Control Electronics, Pro Logic Version Rev. 4.45 Diagnostics Manual, 42 pages (Copyright 2014).
Vallet et al., "A study of the failure mechanism of chlorine anodes," Electrochemical Society Proceedings, vol. 95-11, pp. 338-360 (1995).
Voltage to Current Conversion, Apex Manufacturing, Inc., www.apexanalog.com, AN13U RevF, pp. 1-4 (Aug. 2013).
Wallis, "The maintenance of satisfactory water conditions in dolphinaria," Aquatic Mammals, vol. 1, No. 3, pp. 19-25 (1972).
Webb, "Scale Problems in Saltwater Pools," 4 pages (Feb. 2011).
What is Electrochlorination?, http://www.evoqua.com/en/brands/Electrocatalytic/Pages/what-is-electrochlorination.aspx, pp. 1-2 (Date Downloaded Jan. 15, 2017).
Partial International Search Report for Application No. PCT/US2020/027088 dated Jul. 8, 2020.
International Search Report and Written Opinion for Application No. PCT/US2020/027088 dated Aug. 31, 2020.

* cited by examiner

ELECTROLYTIC BIOCIDE-GENERATING UNIT

CROSS-REFERENCE TO RELATED APPLICATIONS

This application claims the benefit of provisional application No. 62/831,526, filed Apr. 9, 2019, and U.S. Provisional Application No. 62/858,739, filed Jun. 7, 2019, which applications are hereby incorporated by reference in their entirety.

TECHNICAL FIELD

The present disclosure relates generally to biocide-generating devices for reducing or eliminating biofouling within water systems.

BACKGROUND

Bio-fouling caused by bio-growth (e.g., salt water or fresh water marine growth) can result in the clogging of water systems, and the inefficient operation, overheating, and malfunction of equipment dependent upon the water systems thereby leading to costly downtime and expensive repair. For some applications, the issue of bio-growth within water systems is addressed by periodic (e.g., semi-annual) acid cleaning of the water systems. Acid cleaning is expensive, time consuming, and involves the use of harsh and hazardous chemicals. Improvements in this area are needed.

SUMMARY

One aspect of the present disclosure relates to a biocide-generating system for inhibiting biofouling within a water system. In one non-limiting example, the system can be a water system of a watercraft such that related equipment (e.g., a heat exchanger) of the watercraft can be operated at peak performance with minimal to no downtime. In certain examples, the biocide-generating system can include an electrolytic arrangement for providing the in situ generation of biocide within the water passing through the water system. In certain examples, the biocide-generating system can be continuously operated or intermittently operated. Biocide-generating systems in accordance with the principles of the present disclosure can be used for both salt water (e.g., sea and brackish water) as well as freshwater applications.

Another aspect of the present disclosure relates to a biocide-generating device including an electrolytic cell for generating biocide in a water system. In one example, the biocide-generating device has a power system configured to enhance the power transfer efficiency of the device. In one example, the biocide-generating device uses relatively high electrical current at relatively low voltage across electrodes of the device to generate biocide. In one example, a current source is used to apply electrical current across the electrodes of the biocide-generating device. To minimize voltage losses due to resistance in the conductive wires, it is desirable for the current source to be located in close proximity to the electrodes of the electrolytic cell (i.e., the current source is localized with respect to the electrodes). In one example, the current source and the electrolytic cell are integrated in one housing. In certain examples, other types of circuitry are integrated into the same housing as the electrolytic cell. Example circuitry can include electrical isolation circuitry for isolating the power source of the biocide-generating device from boat ground (e.g., the circuitry can provide a power source having a zero reference voltage that is isolated with respect to boat ground, but that is coupled (e.g., inductively coupled by an isolated switching power supply) to a power source coupled to boat ground, control circuitry for adjusting the magnitude, polarity and frequency of the current provided to the electrodes based on a water flow through the electrolytic cell, voltage regulators, and power conversion circuitry such DC-DC conversion circuitry and/or AC-DC conversion circuitry. In one example, the biocide-generating device can include a housing having an electrolytic chamber in which the electrodes are exposed to water flowing through the device, and a control chamber that houses circuitry of the type described above. In one example, the circuitry can be mounted on a circuit board, the electrodes can include electrically conductive posts that extend through the circuit board, and the electrodes can include electrically conductive plates coupled to the electrically conductive posts for generating biocide within the water flowing through the electrolytic cell.

Another aspect of the present disclosure relates to a biocide-generating device including an electrolytic cell for generating biocide in a water system, and a heat sink arrangement that uses water flowing though the electrolytic cell to cool circuitry of the biocide-generating device. In one example, the circuitry can include a current source for applying current thru electrodes of the electrolytic cell. Other circuitry can include electrical isolation circuitry for isolating a power source of the biocide-generating device from boat ground (e.g., the circuitry can provide a power source that is inductively coupled by an isolated switching power supply to a power source coupled to boat ground, but that has its own zero reference voltage that is isolated from boat ground), control circuitry for adjusting the magnitude of the current provided to the electrodes based on a water flow through the electrolytic cell, voltage regulators, and power conversion circuitry such DC-DC conversion circuitry and/or AC-DC conversion circuitry.

In certain examples, the biocide-generating device includes a housing defining an electrolytic cell chamber (e.g., a biocide-generating chamber) through which the water in which the biocide is being generated flows, and the heat from the circuitry is transferred to the water to provide efficient cooling (e.g., via thermal coupling through the housing or other thermal coupling means). In certain examples, the housing (e.g., a main housing body and/or a housing lid) has a construction that is thermally conductive and includes one or more heat transfer structures or features (e.g., fins, baffles, projections, plates, surfaces, layers, etc.) that are exposed to the water passing through the housing. In certain examples, heat is transferred through a wall of the housing of the biocide-generating device from the circuitry to the water flowing through the biocide-generating chamber of the housing. The wall can include a side wall, an end wall, a wall of a lid, a wall supporting the circuitry or a combination thereof. The walls can include heat transfer fins or other heat transfer structures/features. Electrically insulating thermally conductive layers can be used to provide a thermal coupling between the housing and the circuitry while concurrently electrically isolating the housing from the circuitry.

In certain examples, portions of the housing can have a polymeric construction that is not readily thermally conductive, and additional features (e.g., thermal pathways, heat sinks, etc.) can be provided for transferring heat from the heat generating components to the water flowing through the device. For example, thermally conductive fins, plates, members, rods, or other features can be immersed in or otherwise in contact with the water and thermally coupled to the heat generating components by thermal pathways that extend through a wall or other structure of the housing. In certain examples, the thermally conducting features in contact with the water optionally can be electrolytic plates forming the electrolytic cell. In certain examples, the circuitry can be incorporated as part of a multi-layer circuit board, and the thermally conductive features in physical contact with the water flowing through the electrolytic cell can be thermally coupled to one or more surface mounted components of the circuit board (e.g., by thermally conductive pathways that may include thermal vias or thermal coins such as copper coins). Electrically insulating thermally conductive layers can be used to provide thermal coupling between the heat transfer elements in contact with the water and the thermal pathways while concurrently electrically isolating the heat transfer elements in contact with the water from the thermal pathways.

The system may also include means for sensing the flow of water through the cell and may also sense the temperature of parts of the electronic circuitry or parts of the housing. Such sensing means can interface with a controller that reduces or terminates power to the electrolytic cell if the water flow becomes inadequate to cool the system electronics to an appropriate operating temperature. Flow can be sensed by flow sensors, by monitoring pump operation and output, and/or by detecting the accumulation of gas in the cell. Electronics temperature also provides an indication of flow since temperatures tend to increase when electric current stays steady while water flow reduces since the water flow reduction provides less cooling. Thus, higher sensed electronics or housing temperatures can indicate reduced water flow through the cell. The cell controller can be configured to terminate or reduce power to the electrolytic cell housing or electronics when or if temperatures exceed a predetermined level.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows.

DETAILED DESCRIPTION

The present disclosure relates to a biocide-generating devices and systems for inhibiting bio-fouling within a water system. Example biocides can include chlorine and derivatives thereof, copper, and other biocides. Certain aspects of the present disclosure relate to features to enhance the efficient use of power during the production of biocide. Other aspects relate to features that manage and dissipate heat generated during the production of biocide to provide enhanced cooling of cell control circuitry.

Figure 1:
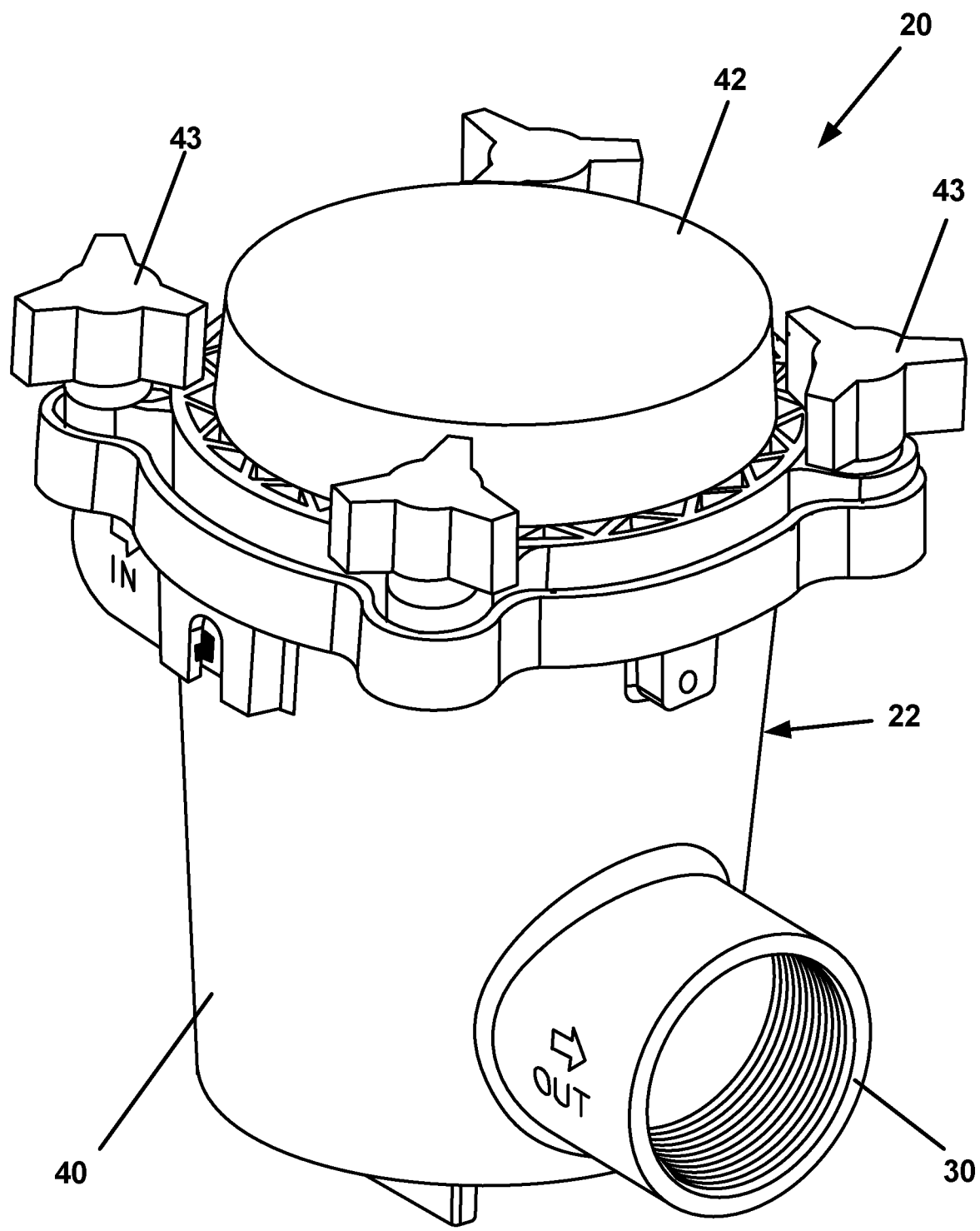
FIG. 1 illustrates a biocide-generating device (e.g., a biocide-generating unit) in accordance with the principles of the present disclosure.
Figure 2:
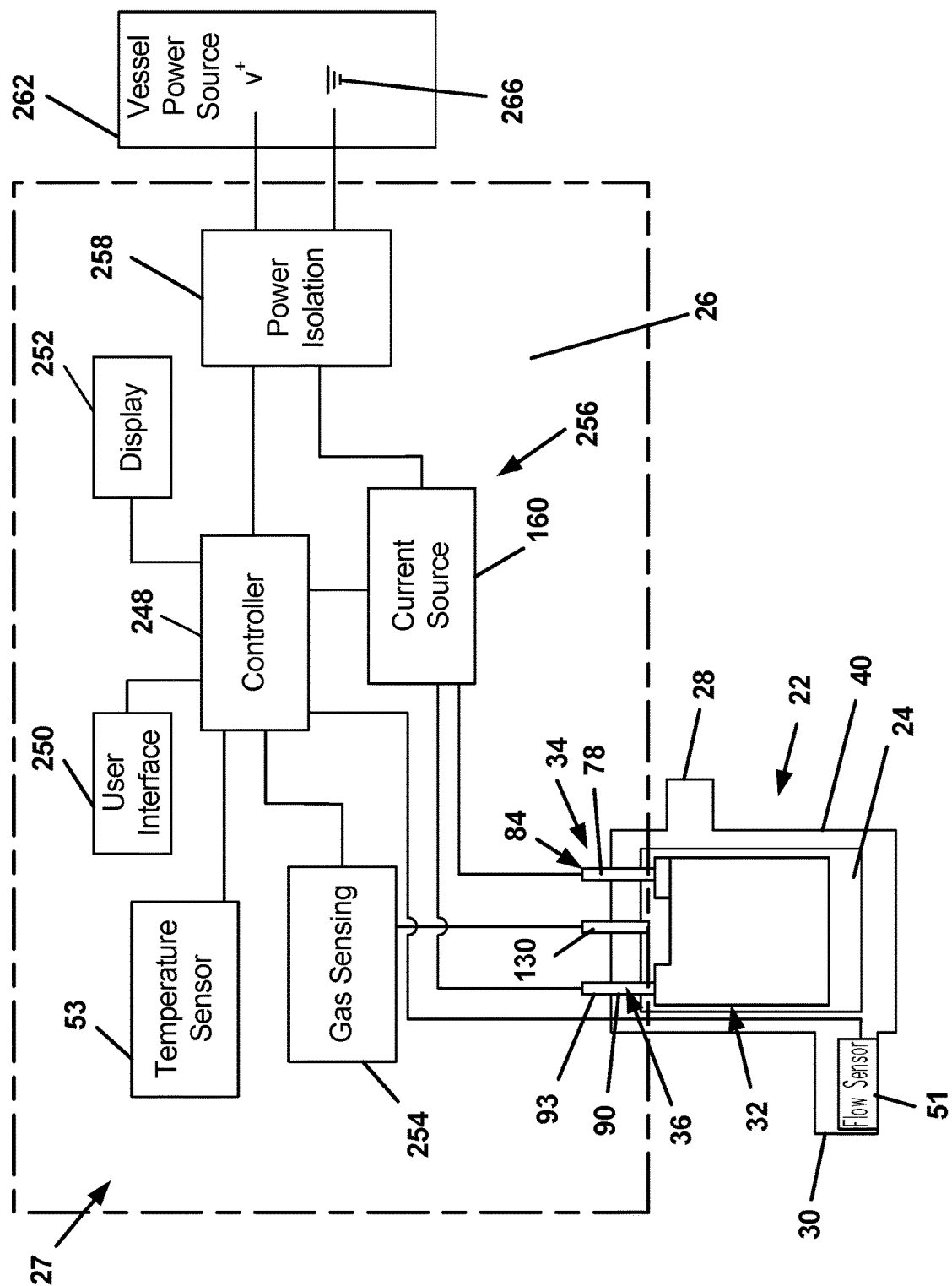
FIG. 2 is a schematic view of the biocide-generating device of FIG. 1.

FIGS. 1-2 depict an example biocide-generating unit 20 (e.g., a biocide-generating device) in accordance with the principles of the present disclosure. The biocide-generating unit 20 includes a unit housing 22 defining a first chamber 24 and a second chamber 26 (see FIGS. 2 and 4). The first chamber 24 provides a location within the unit housing 22 in which biocide can be generated, and the second chamber 26 provides a housing location for circuitry 27 that controls operation of the biocide-generating unit. The unit housing 22 includes a water inlet 28 for receiving water into the first chamber 24 and a water outlet 30 for outputting water containing biocide generated within the first chamber 24 to a water system desired to be treated with biocide (e.g., a water system of a watercraft). The biocide-generating unit 20 also includes an electrode arrangement 32 including first and second electrodes 34, 36 positioned in the first chamber 24 for generating biocide in the water flowing through the first chamber 24 between the water inlet 28 and the water outlet 30 when a voltage is applied across the first and second electrodes 34, 36. Power leads 38 extend outwardly from the unit housing 22. The power leads 38 are adapted for coupling the circuitry 27 within the second chamber 26 to an external power source 262 having its own ground 266. The power source 262 can be a battery, generator, or other power source. In certain examples, the power source can range from 12-240 volts and can provide alternating current (AC) or direct current (DC). Preferred power sources include 12 volt DC, or 24 volt DC, or 110 volt AC or 240 volt AC power sources. At FIGS. 4 and 6, the circuitry 27 is shown integrated as part of a multi-layer circuit board 29. In certain examples, one or more flow sensors 51 can be used to sense the rate of flow of water through the electrolytic cell, and one or more temperature sensors 53 can be used to sense the temperature of the circuitry 27, the chamber 26, and/or portions of the unit housing 22. Power to the cell can be reduced or terminated by a cell controller when low or no flow conditions are detected and/or when temperatures exceed predetermined levels.

Figure 3:
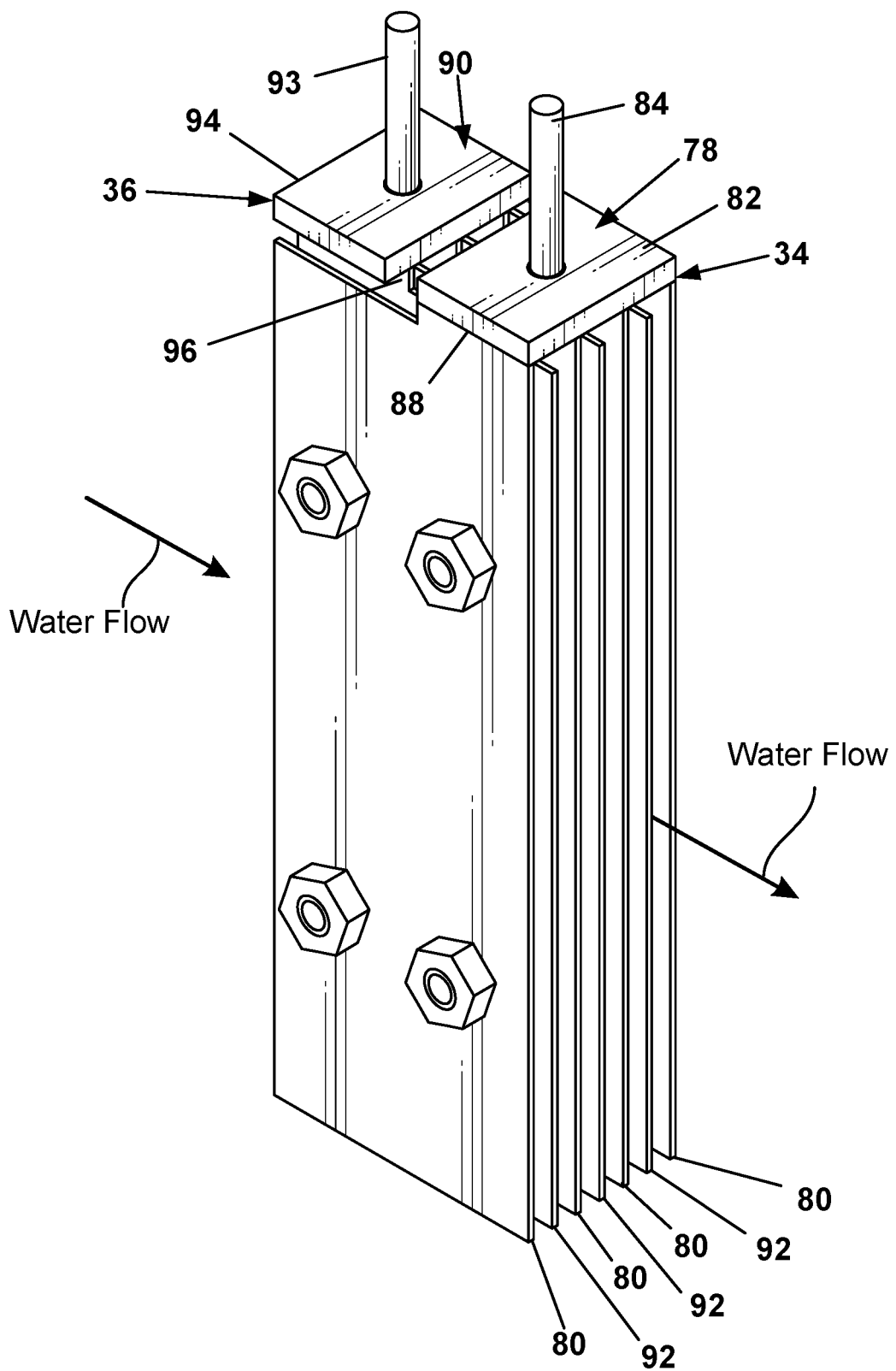
FIG. 3 is a perspective view illustrating an example configuration for an electrode arrangement of the biocide-generating device of FIGS. 1 and 2.

Referring to FIG. 3, the first electrode 34 can include a first terminal 78 electrically coupled to a plurality of parallel first electrode plates 80. The first terminal 78 includes a first terminal block 82 and a first terminal post 84. The first electrode plates 80 are electrically and mechanically coupled to the first terminal block 82. In one example, the first electrode plates 80 include main bodies 86 and upper tabs 88. The upper tabs 88 are preferably electrically and mechanically coupled to the first terminal block 82 by means such as welding or soldering.

Referring still to FIG. 3, the second electrode 36 can have a similar configuration as the first electrode 34. For example, the second electrode 36 includes a second terminal 90 and parallel second electrode plates 92 that are electrically and mechanically coupled to the second terminal 90. The second electrode plates 92 are positioned between the first electrode plates 80 and spaced-apart in relation relative to the first electrode plates 80 such that interstitial space exists between each of the first electrode plates 80 and a corresponding one of the second electrode plates 92. The second terminal 90 includes a second terminal block 94 electrically and mechanically coupled to upper tabs 96 of the second electrode plates 92. The second electrode plates 92 also include main bodies 98 and the second terminal 90 includes a second terminal post 93.

In certain examples, the terminal posts, the terminal blocks and the terminal plates can have metal constructions that include a metal material such as titanium or stainless steel. In certain examples, the first and second electrode plates 80, 92 can be coated with a catalyst material for catalyzing the production of chlorine or derivatives thereof. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium and/or oxides of titanium and/or oxides of tantalum and/or oxides of niobium. It will be appreciated that the above catalysts are merely examples and that other catalyst mixtures can also be used. In other examples, at least one of the sets of electrode plates 80, 92 is constructed of a material that includes copper such that copper ions are generated when voltage is applied across the plates 80, 92.

The circuitry 27 within the second chamber 26 can provide a number of functions. Example functions include: a) power conversion (e.g., DC-DC and/or AC-DC power conversion); b) power regulation; c) electrode polarity switching; d) periodically terminating power to the electrodes and connecting the electrodes together and to a zero reference voltage; e) isolating the circuitry from boat ground; f) gas sensing; g) regulating the current across the electrodes to provide current thru the electrodes; h) monitoring water flow through the biocide-generating unit 20; and i) and adjusting the magnitude of the electrical current flowing across the electrodes based on the water flow through the first chamber 24. To coordinate and implement this various functionality, the circuitry 27 can include a controller (e.g., controller 248) having one or more processors. The processors can interface with software, firmware, and/or hardware. Additionally, the processors can include digital or analog processing capabilities and can interface with memory (e.g., random access memory, read-only memory, or other data storage). In certain examples, the processors can include a programmable logic controller, one or more microprocessors, or like structures. The processors can also interface with displays 252 (e.g., indicator lights, etc.) and user interfaces 250 (e.g., control buttons, switches, etc.) mounted at an exterior of the unit housing 22.

Integrating the circuitry 27 within the unit housing 22 provides a number of advantages. One advantage relates to the efficient use of power. This is particularly true for the case in which the circuitry 27 includes an electrical current source (e.g., an AC or DC current source) which causes electrical current to flow between the first and second electrodes 34, 36 to establish a flow of electric current through the water between the first and second electrodes 34, 36 thereby generating biocide in the water within the first chamber 24. The effective electrochemical generation of biocide using the current source requires relatively high electrical current and relatively low voltage. In this situation, it is desirable for the current source to be in close proximity to the electrodes 34, 36 to minimize losses in wiring routed from the current source to the electrodes 34, 36. By integrating the circuitry 27 within the housing unit 22, the current source can be located directly adjacent to the electrodes 34, 36 and in close proximity to the portions of the electrodes 34, 36 between which electrical current flows during biocide generation (e.g., interleaved electrolytic plates). In certain examples, the current source is located within 2 feet, or 1 foot, or 8 inches or 6 inches of the electrolytic plates 80, 92. In certain examples, the terminal posts 84, 93 are electrically and mechanically coupled directly to the circuit board 29 on which the current source is mounted. A current source can include an electronic circuit that delivers or absorbs electric current independent of the voltage across it.

Another advantage relates to heat dissipation for cooling. Certain of the circuitry 27, particularly power related circuitry for providing power conversion, power regulation, power management, power control, and current control, can generate significant amounts of heat. By integrating the circuitry 27 in the housing unit 22, the water flowing through the first chamber 24 can be used as a vehicle for cooling and dissipating heat. For example, all of the housing or a portion thereof can be made of a thermally conductive material (e.g., a composition that includes a metal such as stainless steel, titanium, other metals, and combinations thereof and compounds formed thereby) that readily transfers heat from the second chamber 26 though the housing 22 to the water flowing through the first chamber 24. The housing 22 can include fins or other structures for enhancing heat transfer rates.

Thermal pathways can be used to conduct heat from the heat generating electrical components to the housing 22. Thermal pathways can include conductive planes/layers of the circuit board 29 for laterally distributing heat. Thermal pathways can also include thermal vias and thermal coins (e.g., larger pieces or sections of metal such as copper mounted in the board for heat transfer purposes) for vertically conveying heat through the circuit board 29. Thermal pathways can further include thermal pads for surface mounting electrical components to the circuit board 29. Thermal pathways can further include electrically insulating thermally conductive layers that can be used to conduct heat to the housing 22 while concurrently maintaining the housing 22 in an electrically isolated state with respect to the circuitry 27.

It will be appreciated that heat generation increases with the magnitude of current passed between the electrodes 34, 36. However, the circuitry 27 preferably varies the magnitude of the current with the flow of water through the biocide unit 20, and the heat dissipation rate of the water flowing through the biocide unit 20 varies with the water flow. Therefore, when higher electrical current levels are provided to match higher water flows through the biocide unit 20, the higher water flows provide increased heat dissipation capacity to effectively remove the increased heat generated by the current source when the higher current levels are provided.

Figure 4:
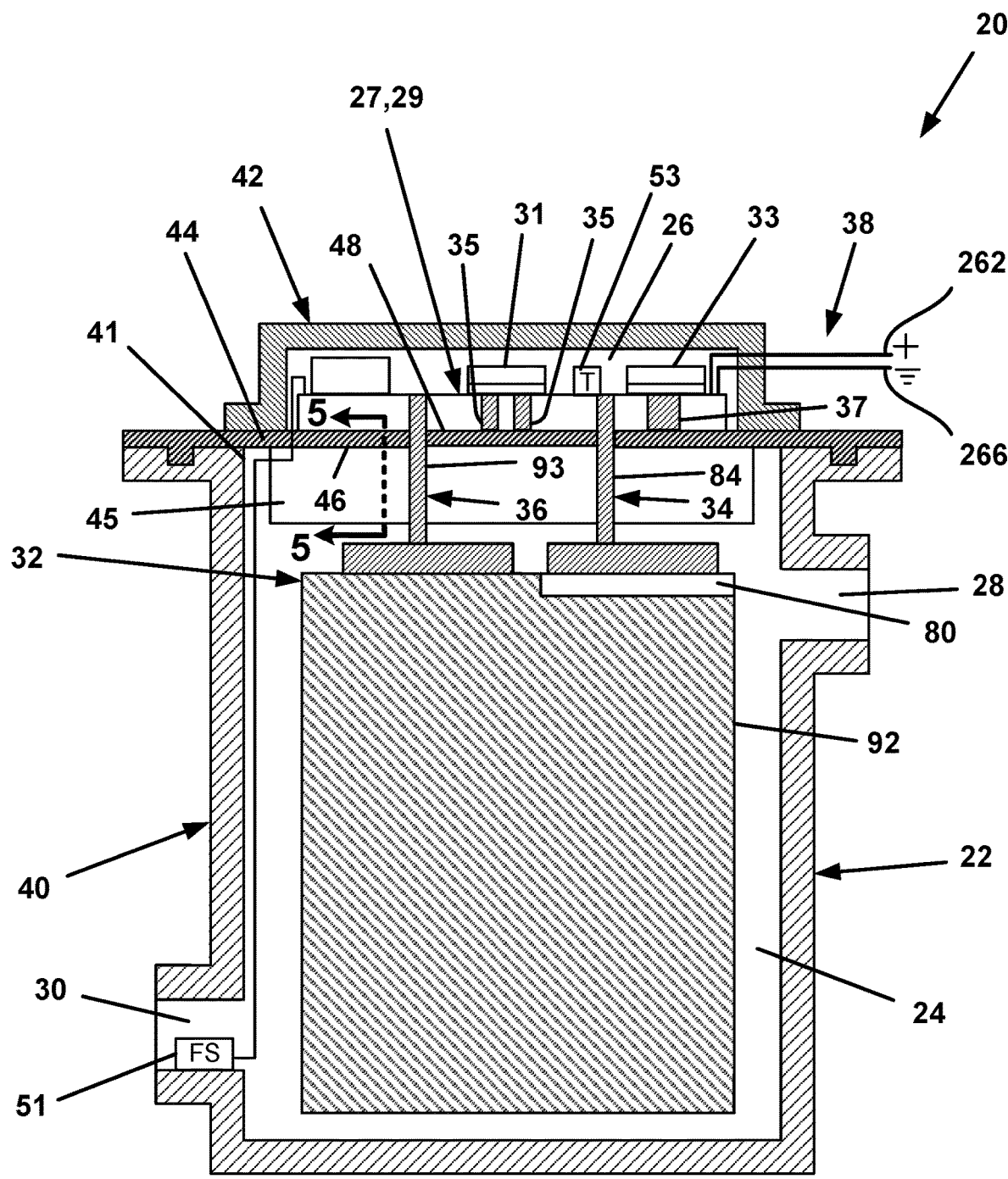
FIG. 4 is a cross-sectional view showing an example heat transfer arrangement (e.g., an example heat sink configuration) for the biocide-generating device of FIGS. 1-2.

Referring to FIG. 4, the unit housing 22 includes a main housing body 40 defining the first chamber 24. The main housing body 40 has an open end 41. The unit housing 22 also including a housing cover 42 that mounts over the open end 41 of the main housing body 40 to enclose the first chamber 24. The housing cover 42 can attach to the main housing body 40 by fasteners such as bolts 43 (see FIG. 1). The second chamber 26 is defined within the housing cover 42. The second chamber 26 can optionally be re-enterable and can include an access panel or door for accessing the interior of the chamber 26. The housing cover 42 includes a base wall 44 having first and second opposite surfaces 46, 48. The second surface 48 is an upper surface that defines a portion (e.g., a base portion) of an interior of the second chamber 26 and is exposed to the interior of the second chamber 26. The first surface 46 is a bottom surface and is adapted to oppose and enclose the open end 41 of the main housing body 40 when the housing cover 42 is mounted on the main housing body 40. With the housing cover 42 mounted to the main housing body 40, the first surface 46 defines a top of the first chamber 24 and is exposed to an interior of the first chamber 24. Thus, the base wall 44 forms a common wall that separates the first and second chambers 24, 26 when the housing cover 42 is mounted on the main housing body 40.

Figure 5:
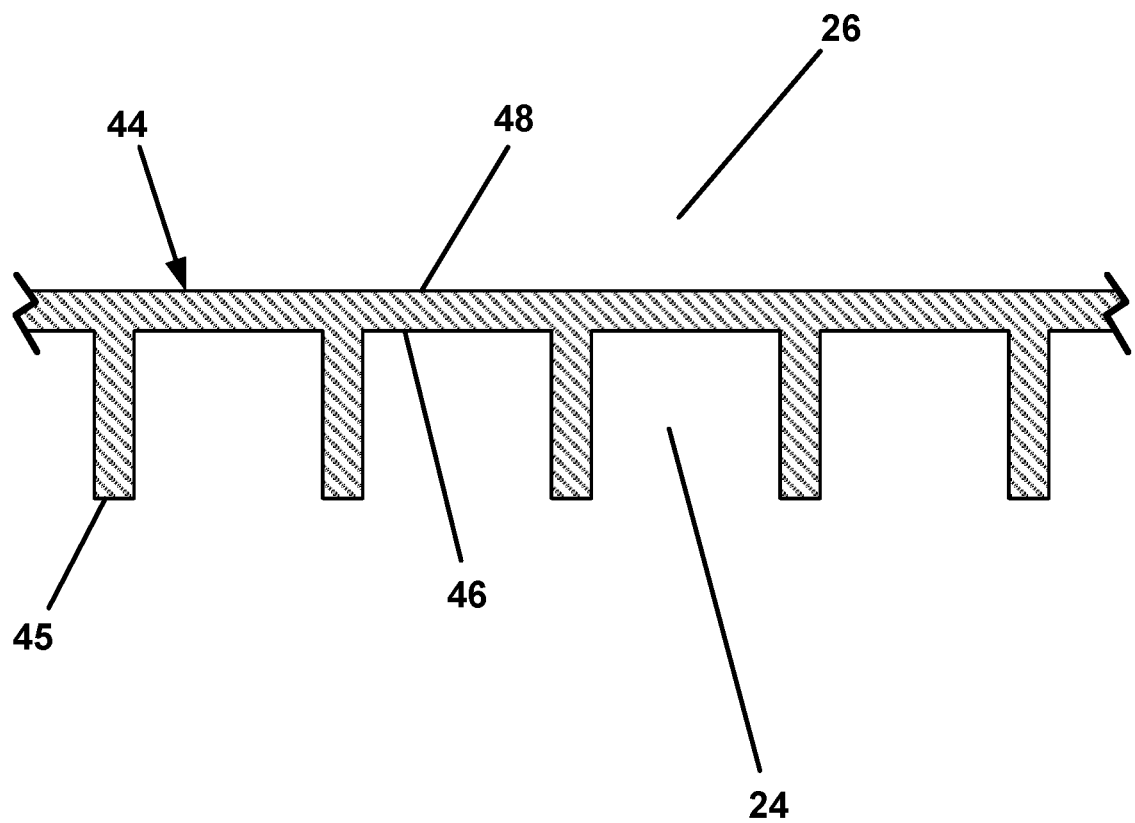
FIG. 5 is a cross-sectional view take along section line 5-5 of FIG. 4.

The base wall 44 can be made of a material that readily conducts heat (e.g., a composition including metal such as stainless steel or titanium that resists corrosion and is thermally conductive) and can function as a heat sink for transferring heat from the second chamber 26 to the water flowing through the first chamber 24. The base wall 44 can include projections 45 (e.g., fins or other heat transfer structures, see FIGS. 4 and 5) that project into the first chamber 24 for increasing the surface contact area with the water within the first chamber 24. Heat generating components within the second chamber 26 can be thermally coupled to the base wall 44 by thermally conductive pathways which may include thermal vias, thermal coins, thermally conductive planes or layers, or other pathways suitable for efficiently conveying heat to the base wall 44 by conduction. It will be appreciated that thermally conductive pathways can include one or more electrically insulating thermally conductive layers which maintain the base wall 44 in an electrically isolated state with respect to the circuitry 27.

In general, for the purposes of this disclosure, a thermally conductive material has a thermal conductivity equal to or greater than 1 watt per meter Kelvin (w/mK). For example, thermally conductive epoxies that are electrically insulating often have thermal conductivities in the range of 1-5 w/mK. Example thermally conductive and electrically insulating epoxies can include fillers such as aluminum oxide or aluminum nitride. Conductive pathways such as thermal vias, thermal coins and the like often have a composition that includes metal having a very high thermal conductivity. For example, copper has a thermal conductivity greater than 400 w/mK and aluminum has a thermal conductivity greater than 200 w/mK. Certain electrically insulating thermally conductive layers can be used to thermally couple heat transfer components to the circuitry 27 while maintaining the heat transfer components electrically isolated with respect to the circuitry. Such layers can include relatively thin polymeric layers that optionally may include thermally conductive fillers. Example fillers may include ceramic materials such as boron nitride, alumina, aluminum nitride, silicon carbide or silicon nitride. Preferably, metals forming thermal paths that might corrode in contact with water or salt water will be isolated from liquid contact by a thermally conductive material that is not subject to corrosion.

In certain examples, features other than those unitary with the housing 22 can be used to transfer heat to the water flowing through the biocide-generating device 20. Example features can include plates, rods, fins or other structures. By using such features, the housing cover 42 (particularly the base wall 44) can be made of material such as a polymeric material (e.g., polycarbonate) having dielectric and relatively low thermal conductivity properties. By manufacturing the housing cover 42 of a polymeric material which is itself dielectric, separate provisions need not be made for ensuring that the housing cover 42 is electrically isolated from the circuitry 27. The electrode arrangement 32 is one example of a feature that is not unitary with the housing 22 that can be used to effectively transfer heat to the water that flows through the biocide-generating device 20 during operation of the biocide-generating device 20.

Figure 6:
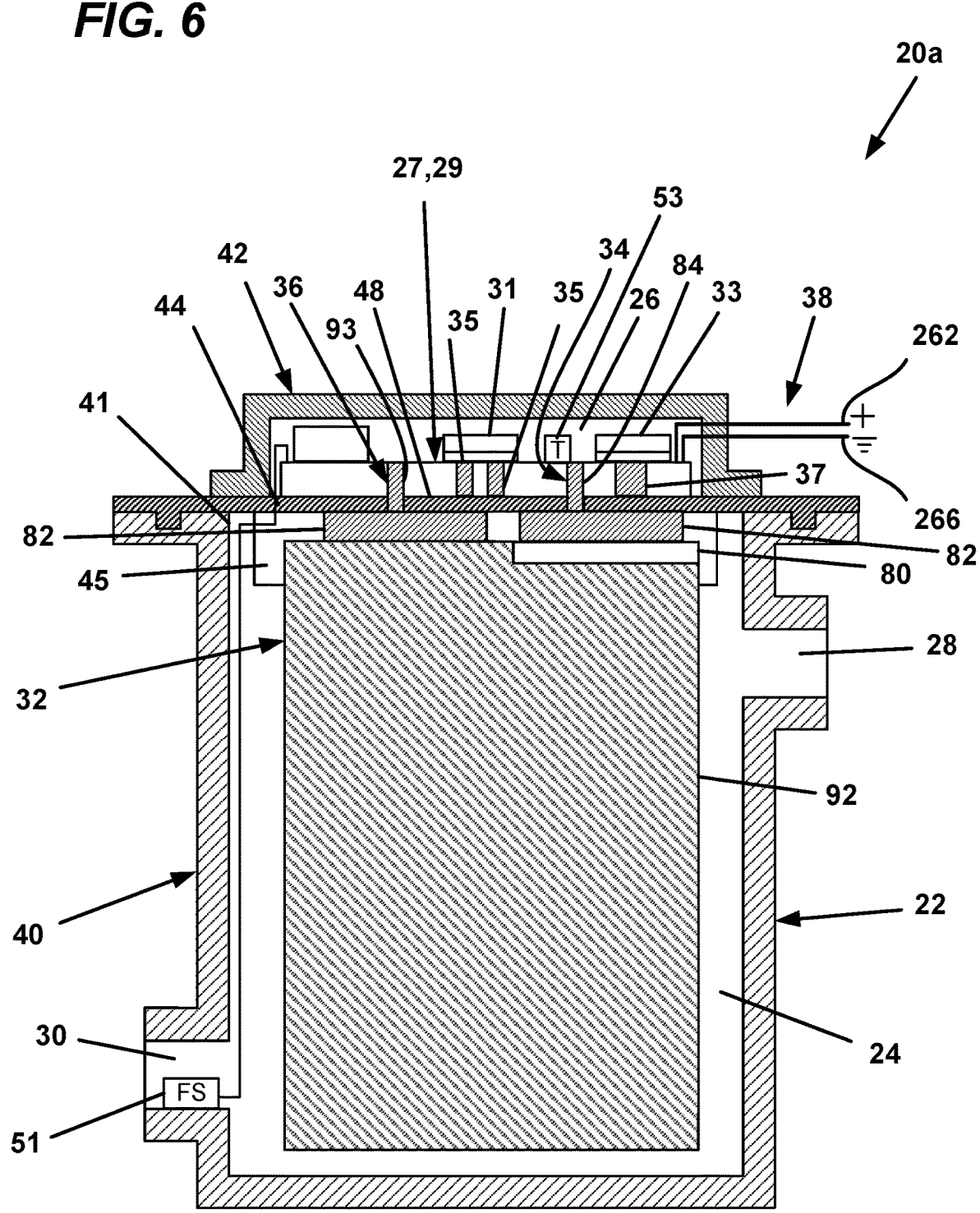
FIG. 6 is a cross-sectional view showing another example heat transfer arrangement (e.g., an example heat sink configuration) for the biocide-generating device of FIGS. 1-2.

FIG. 6 shows another biocide-generating device 20a in accordance with the principles of the present disclosure in which the electrode arrangement 32 is used as a heat sink for transferring heat from the circuitry 27 within the second chamber 26 to the water flowing through the first chamber 24. The terminal posts 84, 93 extend through the base wall 44 and connect directly with the circuit board 29. Thermal pathways including thermal conducting planes/layers, thermal vias, thermal coins, and other metal integrated with the circuit board 29 can be used to conduct heat from the heat generating components of the circuitry to the terminal posts 84, 93. Electrically insulating and thermally conductive layers can be used to electrically isolate the terminal posts 84, 93 from the thermal pathways. The terminal posts 84, 93 are preferably electrically connected to the current source and the zero voltage reference of the circuitry 27, but are not electrically connected to the thermal pathways. Heat transferred to the terminal posts 84, 93 from the thermal pathways is transferred through the posts 84, 93 and the terminal blocks 82, 94 to the electrolytic plates 80, 92 which provide a large surface area for effectively transferring the heat to the water flowing between and across the electrolytic plates 80, 92. In the example of FIG. 6, it is preferred for the base wall 44 to be made of a dielectric material such as a polymeric material. However, in other examples, the electrode arrangement 32 may be also used as a heat sink for an embodiment in which the base wall 44 has a metal construction. In such examples, the terminal posts 84, 93 are preferably electrically isolated from the base wall 44 by one or more electrically insulating and thermally conductive layers.

Referring back to FIG. 2, the circuitry 27 can include a controller 248 which is shown interfacing with the user interface 250, the display 252, a sensing circuit 254, a cell power circuit 256, and an isolation circuit 258. The sensing circuit 254 can be configured to detect/sense the accumulation of gas within the first chamber 24. The cell power circuit 256 can be configured to supply electrical power to the first and second electrodes 34, 36. In one example, the cell power circuit 256 includes a current source 160 for driving a current through the electrolytic cell which is not dependent upon the load across the electrodes or the applied voltage. The magnitude, frequency and polarity of the current provided by the current source can be varied by the controller to regulate the amount of biocide generated by the system. The isolation circuit 258 transfers power from a power source 262 to the circuitry 27 and concurrently provides the circuitry 27 with a zero voltage reference that is electrically isolated from a boat ground 266. Further details of sensing circuitry, power circuitry, isolation circuitry and polarity switching circuitry are described in U.S. patent application Ser. No. 16/152,176, which is hereby incorporated by reference in its entirety.

In certain examples, the circuitry 27 is integrated as part of the multi-layer circuit board 29 (see FIGS. 4 and 6) that includes electrically conductive paths (e.g., traces, tracks, portions, sections) that electrically interconnect the various electrical components of the circuitry 27. Electrical component such as surface mounted electrical components can be mounted on the circuit board 29. As depicted at FIGS. 4 and 6, the circuitry includes a surface mounted electrical component 31 which is a heat generating component of the current source 160 and a surface mounted component 33 which is a heat generating component of the isolation circuit 258. Thermally conductive structures such as thermal vias 35, thermal coins 37 or other thermally conductive structures (e.g., metal structures) can be integrated in the circuit board 29 to form at least portions of thermal transfer paths for conducting heat from the heat generating components to heat sink structures adapted to be immersed in the water flowing through the first chamber 24 when the biocide-generating device is in operation. The thermal transfer paths can also include thermally conductive horizontal layers or planes of the circuit board 29 as well as other metal in the circuit board. The thermal transfer paths can also include thermally conductive portions of the housing as well as thermally conductive structures that extend through portions of the housing and/or are carried with the housing cover or the housing base. In the example of FIG. 4, the thermal transfer paths conduct heat to the fins 45 integrated with the base wall 44 of the housing cover 42. In the example of FIG. 6, the thermal transfer paths conduct heat to the electrode arrangement 32.

In certain examples, the sensing circuit 254 of the biocide-generating system 24 can be configured for detecting the accumulation of gas within the housing 52. A preferred gas sensor for the sensing circuit 254 includes a gas sensing electrode 130 that senses the presence of collected gas based on the difference in electrical conductivity between sea water and gas. In certain examples, the sensing circuit 254 senses electrical connectivity between the gas sensing electrode 130 and another component of the electrolytic cell. In one example, electrical connectivity is sensed between the gas sensing electrode 130 and either the first terminal 78 or the second terminal 90.

The isolation circuit 258 is configured for electrically isolating the power source 262 from the electrical components of the biocide-generating system 24. For example, the isolation circuit 258 can transfer electrical power from the power source 262 to the biocide-generating device 20 in a manner where the biocide-generating device 20 is provided with the zero voltage reference 264 that is not electrically connected to (i.e., is electrically isolated from) the boat ground 266 of the watercraft 20. In one example, the isolation circuit 258 inductively transfers electrical power to the biocide-generating device 20 via a transformer that may include inductive coils. In an example embodiment, the isolation circuit 258 is implemented using a VHB100 W DC-DC converter available from CUI, Inc. of Tualatin, Oreg. Other isolation circuits, including other types of DC-DC converters having different voltage thresholds, are useable as well. A voltage regulator can regulate electrical power provided to the controller 248, the display 252 and other lower power components of the system.

To precisely control the amount of biocide generated at the electrode arrangement 72, it is preferred for a current source to be used to cause electrical current to flow between the first electrode 74 and the second electrode 76 for driving the electrolysis reaction. In certain examples, the cell power circuit 256 includes the current source 160 (see FIG. 2). In certain examples, the controller 248 can control the current source 160 via a control line to vary the electrical current flowing between the first and second electrodes 74, 76 based on a water flow through the electrolytic cell (e.g., a volumetric flow rate, mass flow rate). The water flow can be determined by a reading from the flow sensor 51 (e.g., a flow meter) or other means, including the rate of temperature rise for a given input of electrical current flow and voltage drop across the electrodes. This would allow an input power calculation and a determination of fluid flow through the electrolytic cell. Example flow meters can include volumetric flow meters such as positive displacement flow meters, velocity flow meters, mass flow meters and inferential flow meters. Depending upon the type of flow meter used, volumetric flow can be directly measured or calculated/estimated based on flow meter readings. In certain examples, the controller 248 can increase the magnitude of the electrical current with an increase in the water flow and decrease the magnitude of the electrical current with a decrease in the water flow so as to maintain a constant biocide concentration (or at least a biocide concentration within a target range) in the water discharged from the first chamber 26. It will be appreciated that the magnitude of the current provided to the electrode arrangement 32 can be modified based on water flow through the water system and other factors.

In certain examples, the rate of temperature change of the control electronics of the electrolytic cell is related to the rate of change in power provided to the electrodes and the rate of water flow through the electrolytic cell. Similarly, in such examples, the temperature of the electronics of the electrolytic cell, the electrical power provided to the electrolytic cell and the rate of water flowing through the electrolytic cell all relate to one another. Information such as water flow, electrical power and electronics temperature can be determined empirically and mapped in a data map or look-up table. By using the data map, a controller can determine the water flow based on a sensed temperature or change in temperature of the electronics in combination with the electrical power level or change in electrical power level provided to the electrolytic cell. Based on the determined water flow level/rate, the controller can alter the electrical power provide to the electrolytic cell to control a concentration of biocide generated by the electrolytic cell.

Figure 7:
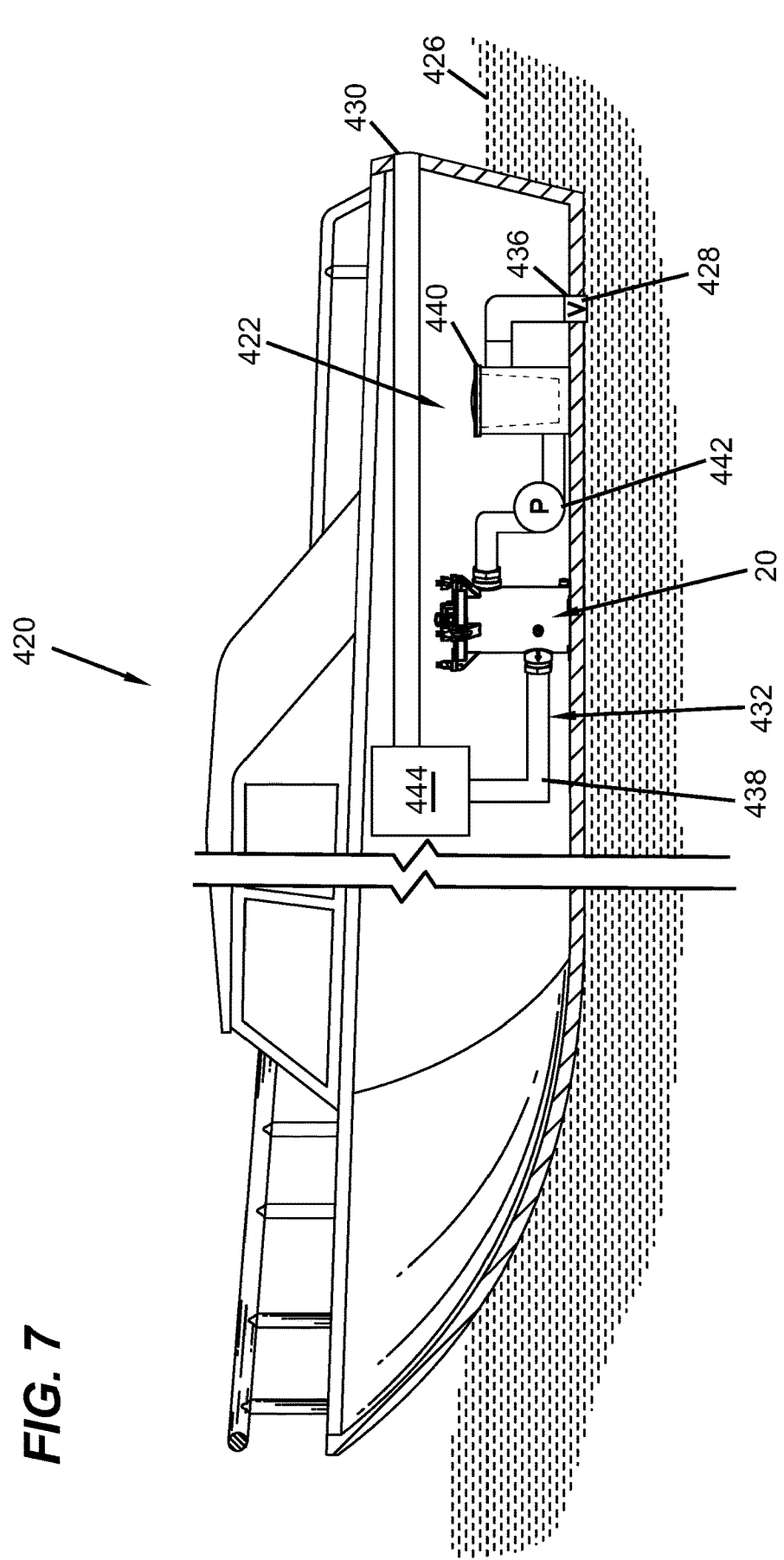
FIG. 7 illustrates a watercraft having an on-board water system incorporating the biocide-generating system of FIGS. 1-2.

FIG. 7 illustrates a watercraft 420 having an on-board water system 422 including the biocide-generating device 20 in accordance with the principles of the present disclosure. The watercraft 420 is shown supported on a body of water 426. The on-board water system 422 includes an inlet 428, an outlet 430, and a water flow path 432 that extends from the inlet 428 through the watercraft 420 to the outlet 430. The inlet 428 is configured for drawing water from the body of water 426 into the water flow path 432. The inlet 428 is located below a water line 434 of the watercraft 420 and is preferably located at a bottom of the hull of the watercraft 420. The inlet 428 can be opened and closed by a valve 436 such as a seacock. The outlet 430 is configured for discharging water that has passed through the water flow path 432 back to the body of water 426. Preferably, the outlet 430 is positioned above the water line 434. The on-board water system 422 can include a plurality of components positioned along the water flow path 432. The water flow path 432 can include a plurality of conduits 438 (e.g., hoses, tubes, pipes, etc.) which extend between the components of the on-board water system 422 and function to carry water along the water flow path 432 between the various components. As shown at FIG. 7, the depicted components include a water strainer 440, a pump 442, and one or more systems and/or equipment 444 that make use of water conveyed through the water flow path 432. The biocide-generating device 20 is adapted for generating a biocide within the water of the water flow path 432 while the water passes through the biocide-generating device 20. The biocide is configured for inhibiting biofouling within the conduits 438 and within one or more of the components positioned along the water flow path 432. It will be appreciated that the biocide can also be referred to as a disinfecting agent or a cleaning agent since the biocide can also include disinfecting and cleaning properties.

It will be appreciated that examples of the type of the systems and/or equipment 444 that can benefit from biocide treatment can include cooling systems such as air conditioners or chillers where water drawn from the body of water 426 can be used as a cooling media for cooling refrigerant of the cooling systems. In other examples, the water from the water flow path 432 can be used to provide engine cooling. In other examples, water from the water flow path 432 can be used for sanitation systems or watercraft propulsion systems.

It will be appreciated that biocide-generating systems in accordance with the principles of the present invention can be used for watercraft launched in both saltwater and freshwater. However, a preferred biocide in accordance with the aspects of the present disclosure includes chlorine generated through the electrolysis of sea water. For freshwater applications, it is contemplated that other biocides such as copper ions could also be generated. In such systems, an electrolytic cell including electrodes including copper can be used to introduce copper as a biocide into the water of the water flow path. In certain examples, at least one of the electrodes includes a material or composition that includes copper. In certain examples, at least a first one of the electrodes includes a material or composition that includes copper (e.g., elemental copper or a compound including copper as a component part), and at least a second one of the electrodes includes a material or composition that includes stainless steel. It will be appreciated that when voltage is applied across the electrodes causing the flow of electrical current between the electrodes, copper from the electrode arrangement is introduced into the water flowing across the electrodes.

In accordance with certain aspects of the present disclosure, there is provided a biocide-generating system for inhibiting bio-fouling within a water system of a watercraft, the water system being configured to draw water from a water source on which the watercraft is supported through at least a first port positioned in a body or hull of the watercraft, the biocide-generating system comprising: an electrode arrangement adapted to be incorporated as part of an electrolytic cell driven at least in part by a biocide released from the electrode arrangement into the drawn water. The electrode arrangement comprises metal or other conductive material (e.g., a mixture containing carbon, or a polymer and a metal salt). In some examples, the electrode arrangement comprises one or more of copper, aluminum, zinc, silver or another electrical conductor such as carbon, or conductive polymer, mixed with a bio-inhibiting material, known now or in the future to have bio-inhibiting properties. In certain examples, one or more electrodes of the electrode arrangement comprise copper and one or more other electrodes of the electrode arrangement comprise stainless steel, the copper electrode(s) acting as anode(s) and the stainless steel electrode(s) acting as cathode(s) when the biocide-generating system is generating biocide. According to at least some examples, the electrode arrangement includes copper, and the biocide released from the electrode arrangement is copper ions ($Cu^{++}$).

In accordance with further aspects of the present disclosure, the biocide-generating system includes a control system, the control system being configured to control a concentration of the biocide released into the drawn water by regulating a magnitude of electrical current supplied by an electrical current supply to the electrode arrangement. In some examples, the control system includes a controller that receives input from one or more flow sensors positioned to sense flow of the drawn water within the water system, the input indicating a flow magnitude of water from the water source through the first port, where the flow magnitude corresponds to a volume of water to be treated with biocide. Based at least in part on the sensed flow magnitude, the controller controls the magnitude of current supplied to the electrode arrangement to achieve and/or maintain a predetermined concentration of the biocide within the water system. The predetermined concentration of the biocide can be pre-determined based on one or more parameters, such as a particular type of bio-fouling intended to be inhibited (e.g. preventing biofouling by zebra mussels). The predetermined concentration or target concentration can also be controlled to vary over time to, e.g., extend the lifetime of the electrode arrangement or other components of the onboard water system while still inhibiting biofouling. In certain examples, the predetermined concentration of biocide (e.g., copper) is in a range from about 50 parts per billion (ppb) to about 2,000 ppb. In certain examples, the predetermined concentration is in a range from about 100 ppb to about 500 ppb. In certain examples, the predetermined concentration is in a range from about 150 ppb to about 250 ppb. In certain examples, the predetermined concentration is about 200 ppb.

As indicated above, for saltwater applications, a preferred biocide generated by biocide-generating systems in accordance with the principles of the present disclosure includes chlorine and/or a derivative thereof. Other biocides can also be generated dependent upon the type of salts present in the water. The process for generating biocide can include an in situ process where sea water (e.g., ocean water, brackish water, etc.) is subjected to electrolysis as the sea water flows through an electrolytic cell. The electrolytic cell can include electrodes defining an anode (e.g., a positive pole) and a cathode (e.g., a negative pole). The direct passage of electrical current through the sea water between the anode and the cathode drives electrolysis that separates the water and the salt into their basic elements. In certain examples, chlorine is generated at the anode and hydrogen is generated at the cathode. The chlorine generated at the anode and/or derivatives thereof can function as a biocide for inhibiting bio growth in conduits and equipment of the water flow path located after from the electrolytic cell.

In a preferred example, the biocide concentration in the electrolyte is maintained at a level sufficiently high to kill bio-matter and sufficiently low to avoid damaging corrosion within system. A preferred chlorine concentration is less than or equal to 2 ppm, or less than or equal to 1 ppm, or less than or equal to 0.5 ppm, or less than or equal to 0.3 ppm, or less than or equal to 0.2 ppm or in the range of 0.1-0.2 ppm.

In a preferred example, the biocide-generating system includes an adaptive dynamic control system that dynamically varies the magnitude of the current applied across the electrodes in direct proportion to the flow of water through the electrolytic cell. Thus, the rate of biocide production varies directly with the water flow through the system. The magnitude of electrical current used to provide a desired biocide concentration in the flow of water through the electrolytic cell for a given water flow can be determined by a method such as an algorithm or look-up table. The flow can be determined by a flow sensor 51, or can be determined based on the sensed temperature or the temperature rate of change of the control electronics in view of the electrical power level or rate of change of the electrical power level provided to the electrodes. In one example, the flow sensor 51 is integrated with/attached to the electrolytic cell. In one example, the flow sensor 51 can be mounted adjacent to the outlet of the electrolytic cell to prevent bio-growth from damaging or fouling the flow sensor. By dynamically controlling the rate of biocide generation, it is possible to maintain the concentration of biocide at a target level or within a target range regardless of the water flow.

In other examples, the circuitry 27 can be sealed and enclosed within a housing which also encloses electrodes of an electrolytic cell of a biocide-generating device. For example, the sealed circuitry 27 can be in contact with (e.g., immersed within) the water flowing through the electrolytic cell in which the electrodes are immersed. In one example, the housing can have only one chamber and the circuitry 27 as well as the electrodes can be within the chamber. In other examples, as described above, the circuitry 27 and the electrodes can be in separate chambers of the housing. In still other examples, the circuitry 27 and the electrodes of a biocide-generating device of the type described herein can be positioned in separate housings in closed proximity to each other.

Figure 8:
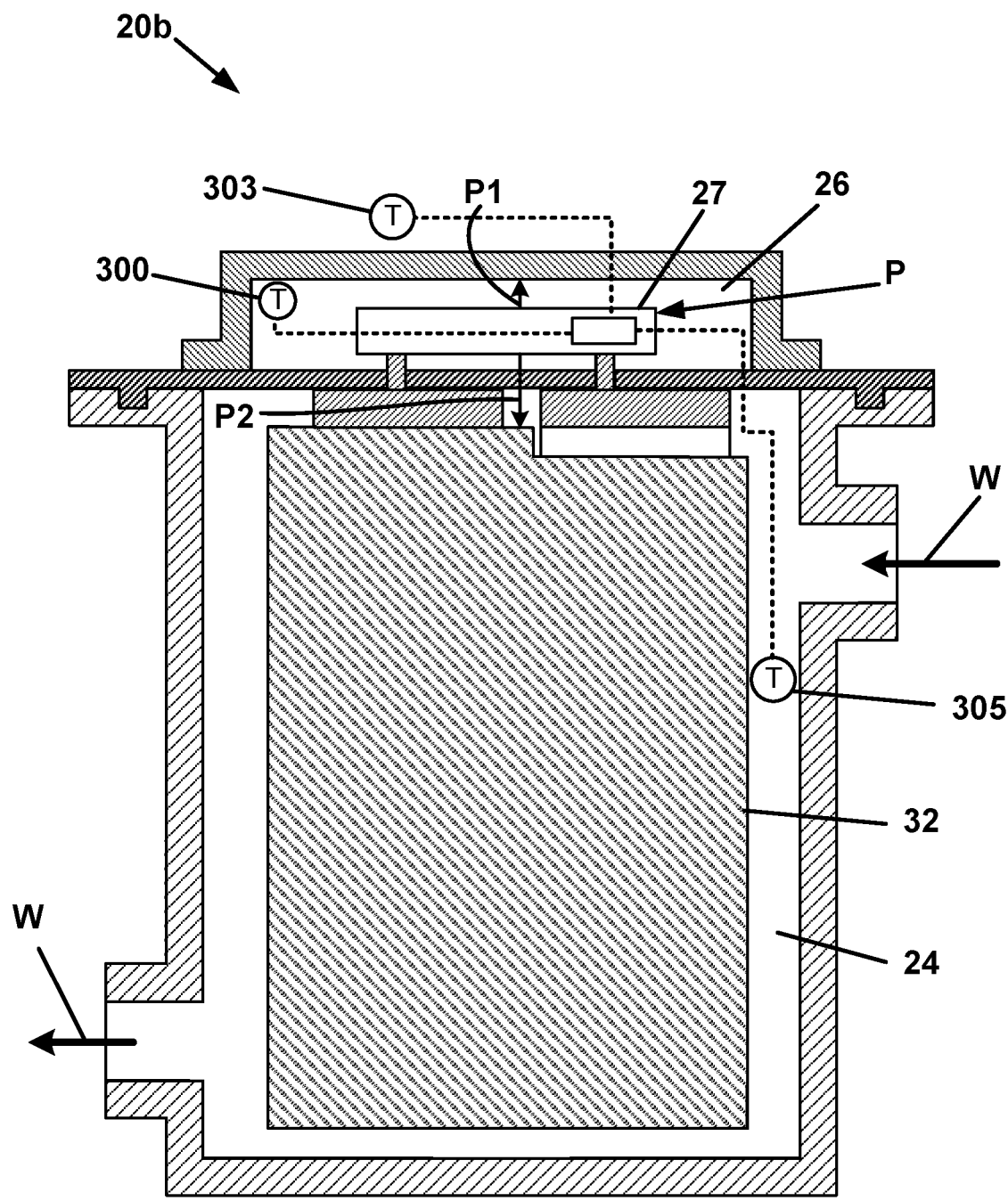
FIG. 8 schematically illustrates a heat transfer model for an example biocide-generating device in accordance with the principles of the present disclosure.

FIG. 8 depicts another biocide generating unit 20*b* in accordance with the principles of the present disclosure. The biocide generating unit 20*b* can have the same configuration as the biocide generating unit 20 or the biocide generating unit 20*a*, except the biocide generating unit 20*b* does not include a separate flow sensor 51 for sensing water flow through the first chamber 24 of the electrolytic cell which contains the electrode arrangement 32. Instead, the rate of water flow through electrolytic cell is determined (e.g., estimated, calculated, approximated) based on a dependent relationship between the rate of water flow through the first chamber 24 and the amount of cooling provided to the system control circuitry 27.

Referring to FIG. 8, a certain level of electrical power P (e.g., electrical power in Watts) is used (e.g., selected) by the control circuitry 27 to drive current across the electrodes of the electrode arrangement 32. The control circuitry 27 can vary the amount of power P used for generating electrical current to control the concentration of biocide being generated in the electrolytic cell.

At the system control circuitry 27, a portion of the electrical power P is converted into heat. A first percentage P1 of the heat is transferred to the control circuitry 27 itself and the surrounding region in the second chamber 26 resulting in an increase in the temperature T1 above ambient temperature of the control circuitry 27 and surrounding region within the second chamber 26. The temperature T1 can be sensed by a temperature sensor 300 in the second chamber 26. A second percentage P2 of the heat is transferred through a heat transfer medium such as a heat sink to the water W flowing through the electrode-containing chamber 24 of the electrolytic cell. The relative values of the first and second percentages P1 and P2 are dependent upon the amount of cooling provided by the flowing water. For example, a ratio of the first and second heat percentages P1/P2 varies indirectly with the flow of water through the electrolytic cell. In one example, the ratio of the percentages P1/P2 increases when the flow of water through the first chamber 24 decreases and the ratio of the percentages P1/P2 decreases when the flow of water through the first chamber increases. The temperature T1 is dependent upon the magnitude of the electrical power P provided to the control circuitry 27, the ratio of the first and second heat percentages P1/P2, the ambient air temperature and the temperature of the water flowing through the electrolytic cell. In certain examples, temperature sensors 303, 305 can optionally be provided for sensing the ambient air temperature and the water temperature.

The dependent relationship described above between the temperature T1 and the rate of water flow through the electrolytic cell allows a control protocol in accordance with the principles of the present disclosure to be used for controlling the power P level used by the circuitry 27 to generate a desired concentration of biocide in the water flowing through the electrolytic cell. The desired concentration of biocide can be pre-programmed into the control system as part of the control logic or can be set by an operator or otherwise varied. The control protocol can utilize one or more control algorithms or can utilize empirically determined data that may be stored in a look-up table, graph or other data collection. The algorithms or empirical data can optionally take into account varying temperature values for the ambient air temperature and the water temperature for examples in which temperature sensors 303, 305 are provided. Alternatively, the algorithms or empirical data can use constant values for the ambient air and water temperatures which are representative of normal operating conditions thereby eliminating the need for the temperature sensors 303, 305.

The control protocol is adapted determine a flow value representative of a rate of water flow through the electrolytic cell based on a characteristic of the sensed temperature T1. Example characteristics of the sensed temperature T1 include a magnitude of the temperature T1 and a rate of change of the temperature T1. At startup of the system, a given power P can be used by the control circuitry 27 to drive electrical current flow across the electrode arrangement 32. As described above, as power is used to drive the flow of electrical current, heat is generated which causes the temperature T1 to increase. The control circuitry 27 monitors a characteristic of the temperature T1 as the electrical current is driven across the electrode arrangement 32. For example, the control circuitry 27 can monitor a rate of change of the temperature T1 during transient conditions (e.g., during a period of time after power P has initially applied during start-up; during a period of time after the power level has been changed; or when the water flow rate though the electrolytic cell changes) or can monitor the magnitude of the sensed temperature T1 itself when the system is operating at steady state. The monitored characteristic of the temperature T1 is used by the control circuitry 27 (e.g., via the implementation of algorithms or look-up tables derived from the dependent relationship between water flow and the temperature T1) to determine the flow value representative of a rate of flow through the electrolytic cell. Once the flow value as been determined, the power level P can be adjusted as needed based on the flow value to generate a desired concentration of biocide in the water flowing through the electrolytic cell. The characteristics of the temperature T1 continues to be monitored as the power level P is adjusted and likewise the flow value continues to be determined to ensure the appropriate concentration of biocide is being generated.

During start-up of the system, a power level P is applied by the control circuitry and the control circuitry can monitor the rate of change of the temperature T1 and/or can monitor the temperature T1 once the system reaches steady state to determine the water flow value. Once the water flow value has been determined, the control circuitry can modify the power level P used for driving electrical current flow based on the water flow value to generate a desired concentration of the biocide in the water flowing through the electrolytic cell. At the adjusted power level, the control circuitry can continue to monitor the temperature T1 or rate of change of the temperature T1 and adjust the power accordingly to provide a desired biocide concentration in the water flowing through the electrolytic cell. When the system has been operating at steady state with steady power P, a change in the temperature T1 is indicative of a change in water flow rate and based on the change in the temperature the system can adjust the power level P to maintain the desired biocide concentration in the water flowing through the electrolytic cell.

FIGS. 9-13 depict a modular system in accordance with the principles of the present disclosure that allows a number of different biocide generating device configurations to be constructed from a number of interchangeable modular components. The modular system allows for product customization to meet customer demand while maintaining manufacturing efficiency. The modular system includes a plurality of different electrode assemblies 32a, 32b, 32c that are each interchangeably mounted in one or more unit housings 22a, 22b, 22c. The electrode arrangements 32a, 32b, 32c can have different sizes, can have different numbers of electrode plates, can have different electrode surface areas, different coatings, or other differences. By selecting different ones of the electrode arrangements 32a, 32b, 32c to be mounted in a given on of the unit housings 22a, 22b, 22c, biocide-generating devices having different biocide generating capacities can be manufactured from the same unit housings 22a, 22b, 22c. For example, by selecting different ones of the electrode arrangements 32a, 32b, 32c, a given one of the housings 22a, 22b, 22c can be designed to be compatible with water systems having different flow rate characteristics (e.g., maximum flow rates, average flow rates, etc.).

Figure 9:
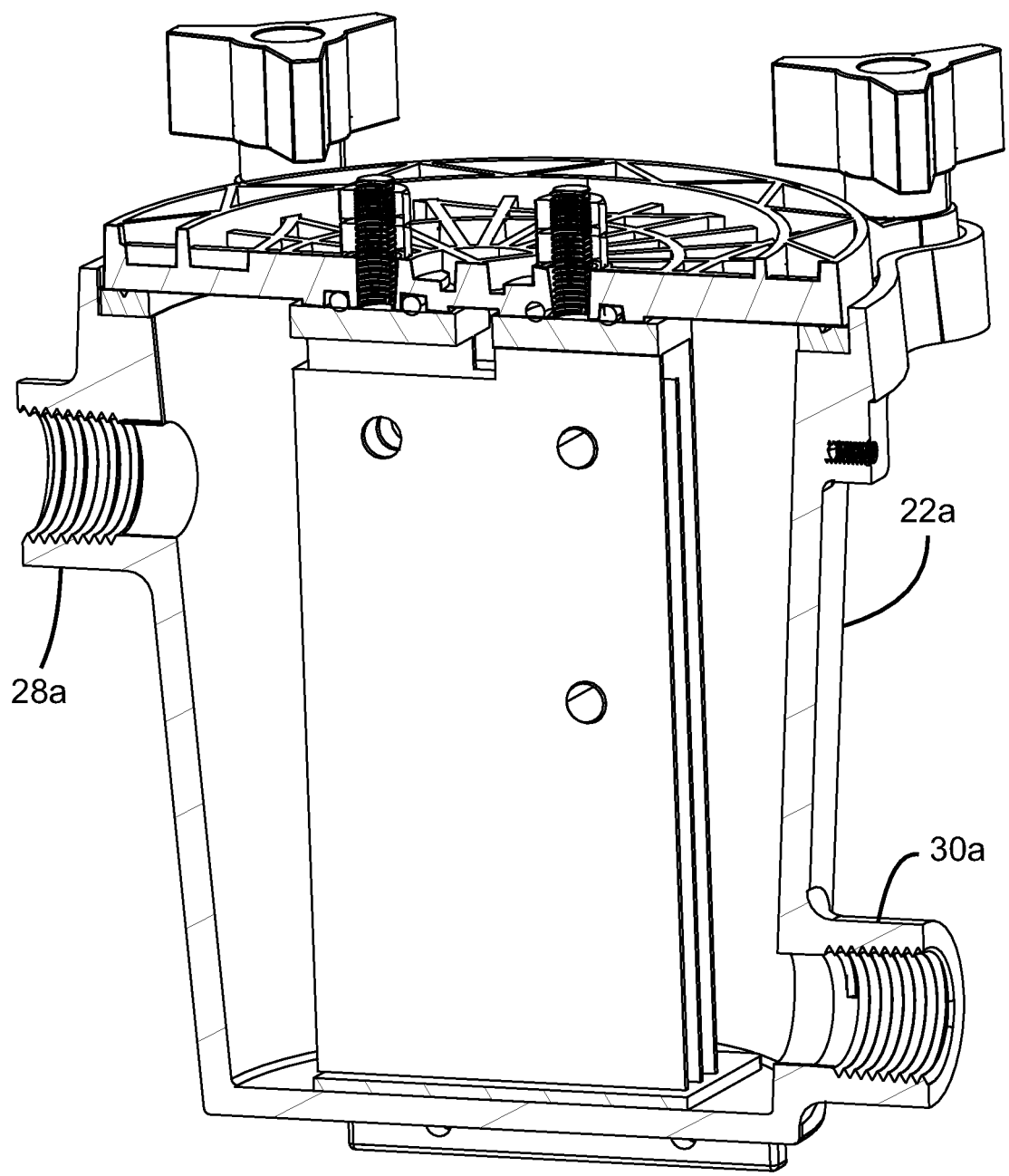
FIG. 9 is a cross-sectional view depicting a first housing and first electrode arrangement of a modular system in accordance with the principles of the present disclosure for manufacturing biocide-generating devices in accordance with the principles of the present disclosure.
Figure 10:
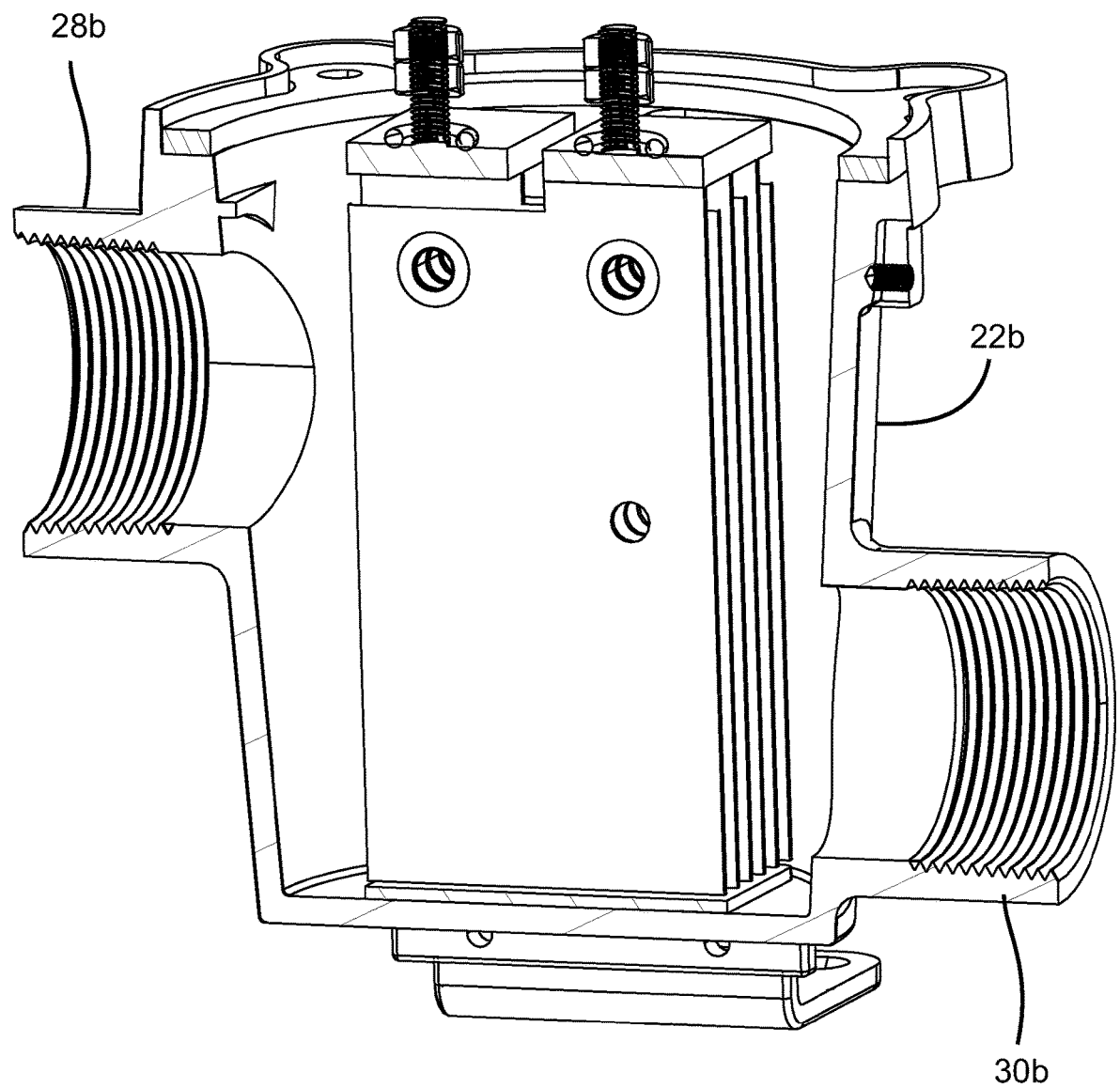
FIG. 10 is a cross-sectional view depicting a second housing and second electrode arrangement of the modular system in accordance with the principles of the present disclosure for manufacturing biocide-generating devices in accordance with the principles of the present disclosure.

Referring to FIGS. 9 and 10, the housings 22a, 22b, 22c can each receive each of the electrode arrangements 32a, 32b, 32c. The housings 22a, 22b, 22c have the same general configuration, but the housing 22a has smaller inlet and outlet ports 28a, 30a as compared to inlet and outlet ports 28b, 30b of the housing 22b. The housing 22c has inlet and outlet ports that are larger than the inlet and outlet ports of the housing 22a and smaller than the inlet and outlet ports of the housing 22b. In other examples, the housing units of the system can have different port sizes, different port shapes, different port thread configurations or other coupling configurations. In certain examples, inserts for occupying volume and controlling flow within the housings can be used in combination with the electrode arrangements 32a, 32b, 32c to enhance compatibility.

Figure 11:
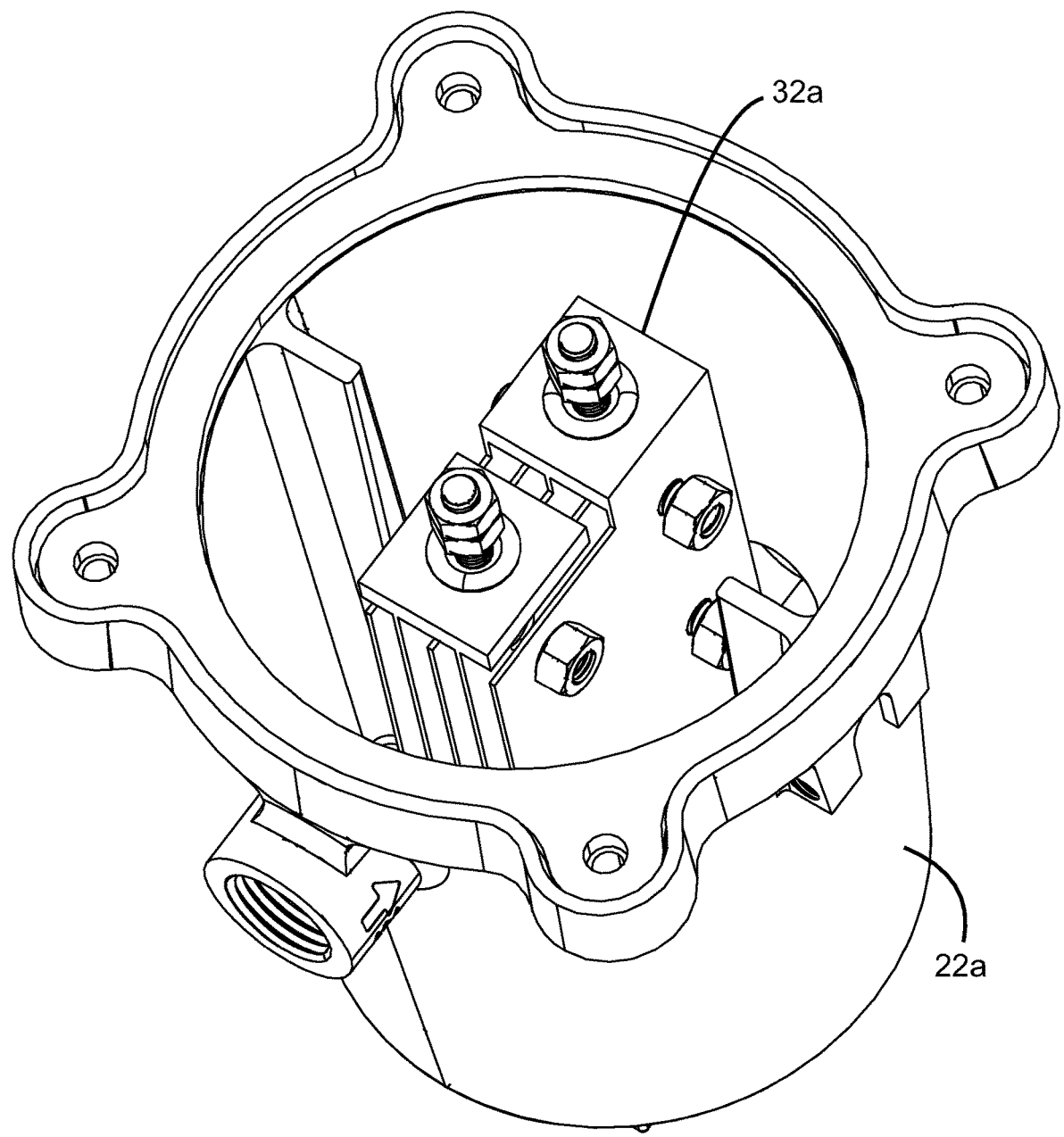
FIG. 11 is another view of the first housing and second electrode arrangement of FIG. 9.
Figure 12:
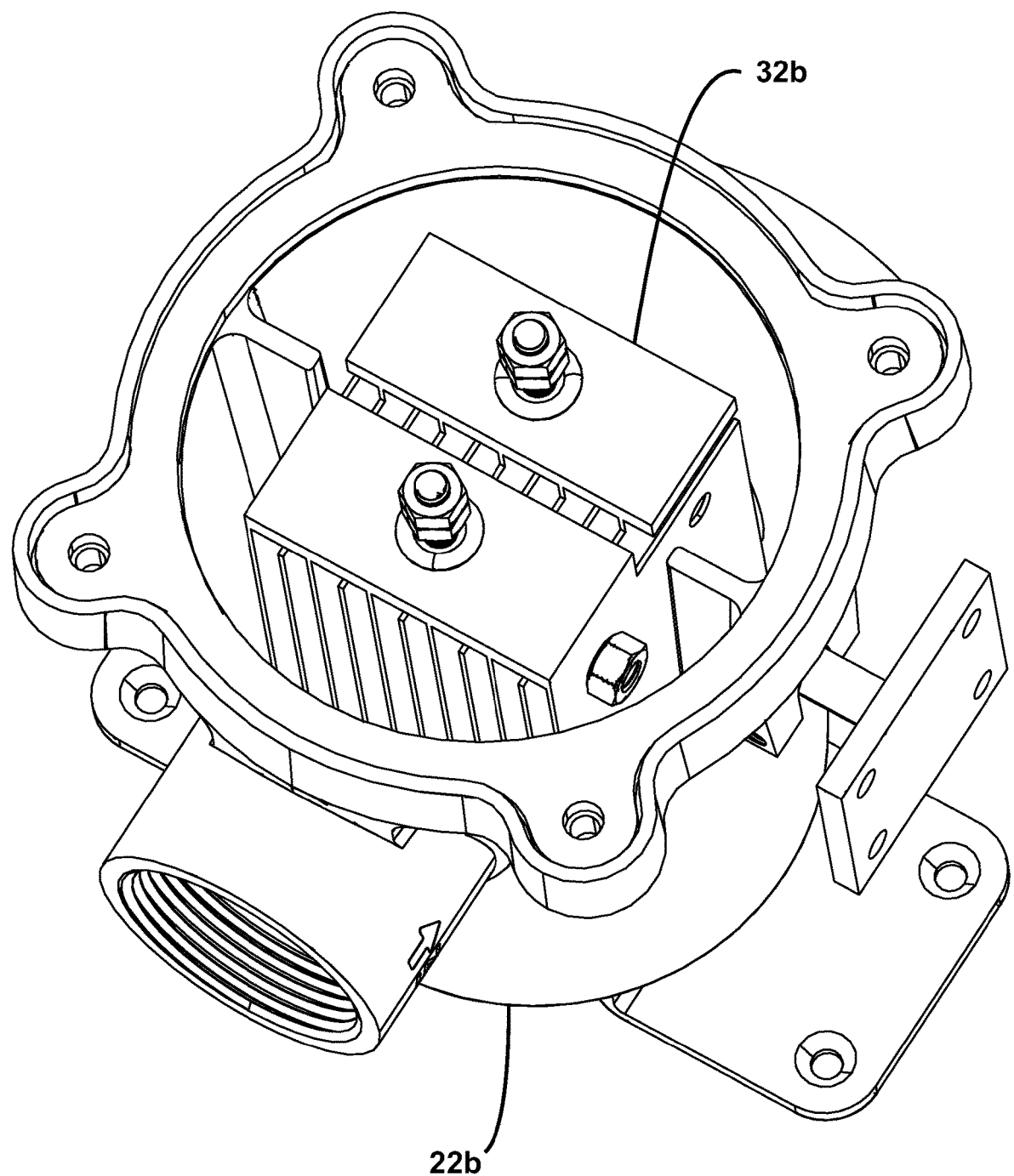
FIG. 12 is another view of the second housing and second electrode arrangement of FIG. 10.
Figure 13:
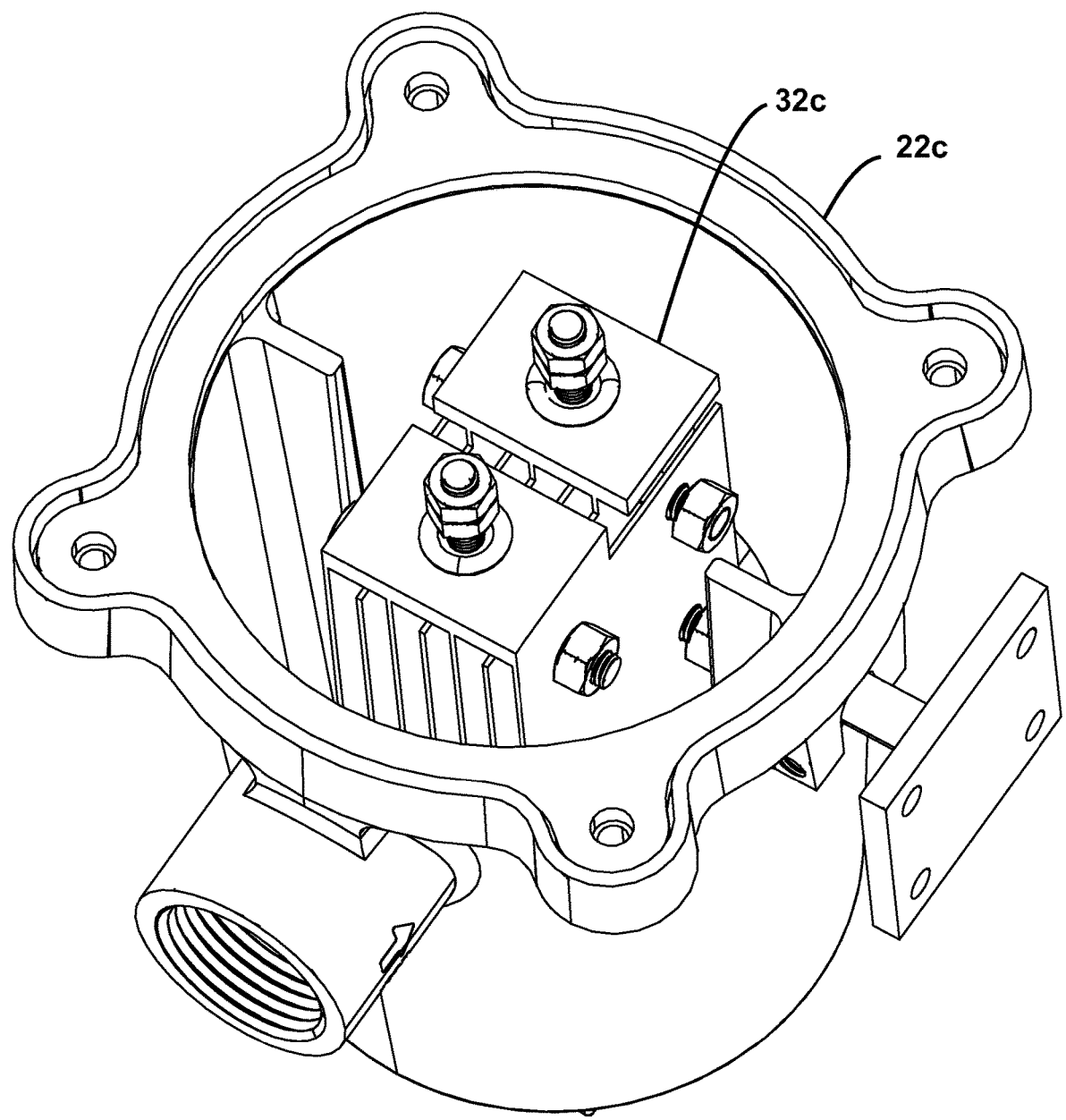
FIG. 13 depicts a third housing and third electrode arrangement of the modular system in accordance with the principles of the present disclosure for manufacturing biocide-generating devices in accordance with the principles of the present disclosure.

Referring to FIGS. 11-13, any of the electrode arrangements 32a, 32b, 32c can mounted in any of the housings 22a, 22b, 22c. The electrode arrangement 32b has more electrode plates and more active surface area than the electrode arrangement 32a, and the electrode arrangement 32c has more electrode plates and more active surface area than the electrode arrangement 32b. Thus, for higher flow water systems the electrode arrangement 32c can be used, for intermediate flow water systems the electrode arrangement 32b can be used, and for lower flow water systems the electrode arrangement 32a can be used.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A biocide-generating device for inhibiting bio-fouling within a water system, the biocide-generating device comprising:
   a housing defining a first chamber and a second chamber, the housing including a water inlet for receiving water from the water system into the first chamber and a water outlet for outputting water containing biocide to the water system;
   an electrode arrangement including first and second electrodes positioned in the first chamber for generating biocide in the water within the first chamber; and
   an electrical power circuit for establishing a flow of electrical current between first and second electrodes of the electrode arrangement for generating the biocide in the water within the first chamber electrolytic cell, the electrical power circuit being positioned within the second chamber;
   wherein the device is configured such that heat generated in the second chamber is transferred to water flowing through the first chamber to provide cooling of components within the second chamber;
   wherein the housing includes a main housing body defining the first chamber, the main housing body having an open end, the housing also including a housing cover that removably mounts over the open end of the main housing body to enclose the first chamber, the second chamber being defined within the housing cover;
   wherein the electrical power circuit is integrated with a printed circuit board within the second chamber for establishing the flow of electrical current between the first and second electrodes, wherein the first and second electrodes of the electrode arrangement include a plurality of interleaved electrolytic plates coupled to terminal posts that extend into the second chamber and are electrically connected to the current source via the printed circuit board;
   wherein the interleaved electrolytic plates are mechanically coupled to the housing cover and fit within the first chamber when the housing cover is mounted on the main housing body;

wherein the housing cover includes a base wall that forms a common wall that separates the first and second chambers when the housing cover is mounted on the main housing body;

wherein the base wall is made of a material including metal and functions as a heat sink for transferring heat from the second chamber to water flowing through the first chamber;

wherein the base wall includes a metal surface adapted to be exposed to the water flowing through the first chamber; and wherein the terminal posts extend through the base wall and connect directly with the circuit board.

2. The biocide-generating device of claim 1, wherein the electrical power circuit is adapted to vary the magnitude and polarity of the electrical current.

3. The biocide-generating device of claim 1, wherein the electrical power circuit includes an isolation circuit positioned within the second chamber that includes a zero voltage reference electrically isolated from a ground of an external power source that powers the electrical power circuit.

4. The biocide-generating device of claim 1, further comprising a temperature sensor for sensing a temperature of a portion of the housing, or the second chamber or a portion of the electrical power circuit, and wherein a controller reduces or terminates power to the electrical power circuit if a temperature sensed by the temperature sensor exceeds a predetermined temperature limit.

5. The biocide-generating device of claim 1, wherein the electrical power circuit includes a DC-DC converter or an AC-DC converter positioned within the second chamber.

6. The biocide-generating device of claim 1, wherein the main housing body has a construction including stainless steel or titanium.

7. The biocide-generating device of claim 1, wherein fins unitary with the base wall project from the base wall into an interior of the first chamber.

8. The biocide-generating device of claim 1, wherein the second chamber is enclosed and sealed, wherein the housing cover is removeable from the main housing body without opening the second chamber, and wherein the electrode arrangement is carried with the housing cover when the housing cover is removed from the main housing body.

9. The biocide-generating device of claim 1, wherein the electrical power circuit is integrated with the printed circuit board within the second chamber.

10. The biocide-generating device of claim 9, wherein the circuit board includes a metal thermal via or a metal thermal coin that forms at least a portion of a thermal transfer path in thermal communication with the base wall of the housing cover that transfers heat from the electrical power circuit to the base wall.

11. The biocide-generating device of claim 10, wherein the thermal transfer path includes a thermal pad for surface mounting an electronic component to the printed circuit board.

12. The biocide-generating device of claim 10, wherein the electrical power circuit is positioned less than 8 inches from the electrolytic plates.

13. The biocide-generating device of claim 1, further comprising a flow sensor for sensing a flow of water through the first chamber, wherein the electrical power circuit includes a constant current source that varies a magnitude of the electrical current that flows between the first and second electrodes dependent upon the flow of water.

14. The biocide-generating device of claim 1, further comprising a temperature sensor for sensing a temperature of a portion of the housing, or the second chamber or a portion of the electrical power circuit, and wherein a controller determines water flow through the biocide-generating device based on the electrical power provided to the electrode and the sensed temperature.

15. The biocide generating device of claim 14, wherein the controller adjusts the electrical power level based on the determined flow to generate a specific biocide concentration.

16. The biocide generating device of claim 1, wherein the metal incudes stainless steel or titanium.

17. The biocide-generating device of claim 1, wherein the terminal posts are electrically isolated from the base wall.

18. The biocide-generating device of claim 1, wherein the housing cover attaches to the main housing body by fasteners.

19. The biocide-generating device of claim 1, wherein the electrode arrangement is used as a heat sink for transferring heat from the circuitry within the second chamber to water flowing through the first chamber.

20. A biocide-generating device for inhibiting bio-fouling within a water system, the biocide-generating device comprising:

a housing defining a first chamber and a second chamber, the housing including a water inlet for receiving water from the water system into the first chamber and a water outlet for outputting water containing biocide to the water system;

an electrode arrangement including first and second electrodes positioned in the first chamber for generating biocide in the water within the first chamber;

an electrical power circuit for establishing a flow of electrical current between first and second electrodes of the electrode arrangement for generating the biocide in the water within the first chamber electrolytic cell, the electrical power circuit being positioned within the second chamber;

the device being configured such that heat generated in the second chamber is transferred to water flowing through the first chamber to provide cooling of components within the second chamber;

a temperature sensor for sensing a temperature of a portion of the housing, or the second chamber or a portion of the electrical power circuit;

the electrical power circuit being part of a control system that determines a flow value representative of water flow through the biocide-generating device based on the electrical power used to drive electrical current across the electrode arrangement and on the sensed temperature.

21. The biocide generating device of claim 20, wherein the control system varies the electrical power used to drive electrical current across the electrode arrangement based on the determined flow value.

22. A biocide-generating device for inhibiting bio-fouling within a water system, the biocide-generating device comprising:

a housing including a water inlet for receiving water from the water system and a water outlet for outputting water containing biocide to the water system;

an electrode arrangement including first and second electrodes positioned in the housing for generating biocide in the water within the housing; and an electrical power circuit for establishing a flow of electrical current between first and second electrodes of the electrode arrangement for generating the biocide in the water within the first chamber electrolytic cell;

the device being configured such that heat generated by the electrical power circuit is transferred to water flowing through the housing to provide cooling;

a temperature sensor for sensing a temperature of at a location affected by heat from electrical power circuit;

the electrical power circuit being part of a control system that determines a flow value representative of water flow through the biocide-generating device based on the electrical power used to drive electrical current across the electrode arrangement and on the sensed temperature.

23. The biocide generating device of claim 22, wherein the control system varies the electrical power used to drive electrical current across the electrode arrangement in response to changes in the determined flow value.

* * * * *